United States Patent [19]

Hasley et al.

[11] Patent Number: 4,656,627

[45] Date of Patent: Apr. 7, 1987

[54] MULTIPHASE PACKET SWITCHING SYSTEM

[75] Inventors: Lloyd A. Hasley, Carrollton, Tex.; Jaan Raamot, Broomfield, Colo.

[73] Assignees: AT&T Company; AT&T Information Systems Inc., both of Holmdel, N.J.

[21] Appl. No.: 674,049

[22] Filed: Nov. 21, 1984

[51] Int. Cl.[4] .............................. H04J 3/02; H04J 3/16
[52] U.S. Cl. .......................................... 370/85; 370/89
[58] Field of Search ....................... 370/85, 94, 86, 89, 370/95; 340/825.5, 825.51

[56] References Cited

U.S. PATENT DOCUMENTS

| | | | |
|---|---|---|---|
| 3,870,825 | 3/1975 | Roberts et al. | 370/85 |
| 4,470,112 | 9/1984 | Dimmick | 364/200 |
| 4,488,218 | 12/1984 | Grimes | 370/60 |
| 4,525,837 | 6/1985 | Tan et al. | 370/94 |

Primary Examiner—Douglas W. Olms
Assistant Examiner—Wellington Chin
Attorney, Agent, or Firm—Donald M. Duft

[57] ABSTRACT

A packet switching system having separate arbitration and data buses together with circuitry for dividing the buses into a plurality of time segments termed phases. The plurality of phases permit a like plurality of separate arbitration operations and a like plurality of separate data exchanges to be effected concurrently on the arbitration bus and data bus, respectively. The use of n phases increases the data transmission capability of the system by a factor of n over prior art arrangements using only a single phase.

22 Claims, 14 Drawing Figures

SWITCHING SYSTEM

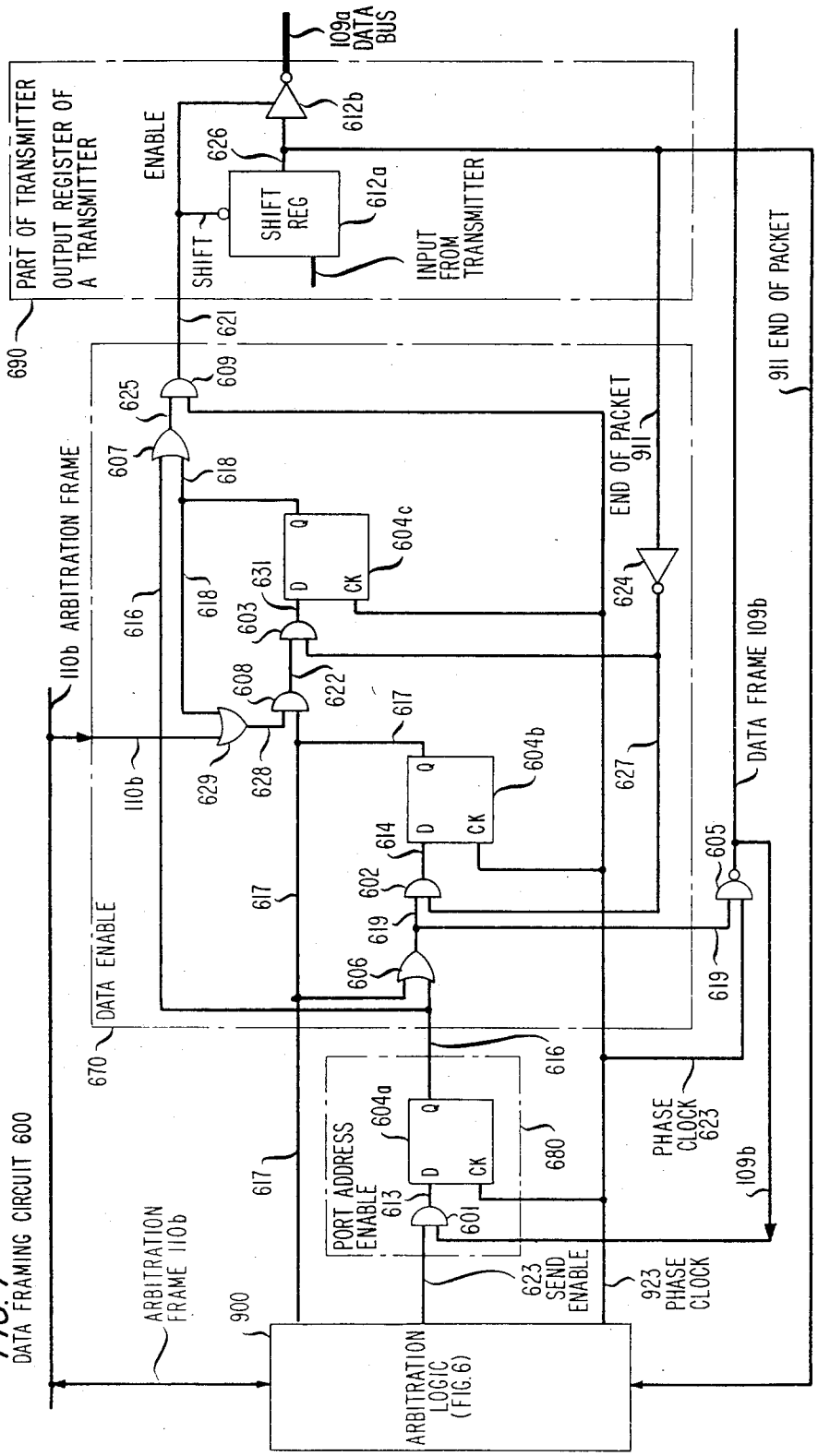
FIG. 7 DATA FRAMING CIRCUIT 600

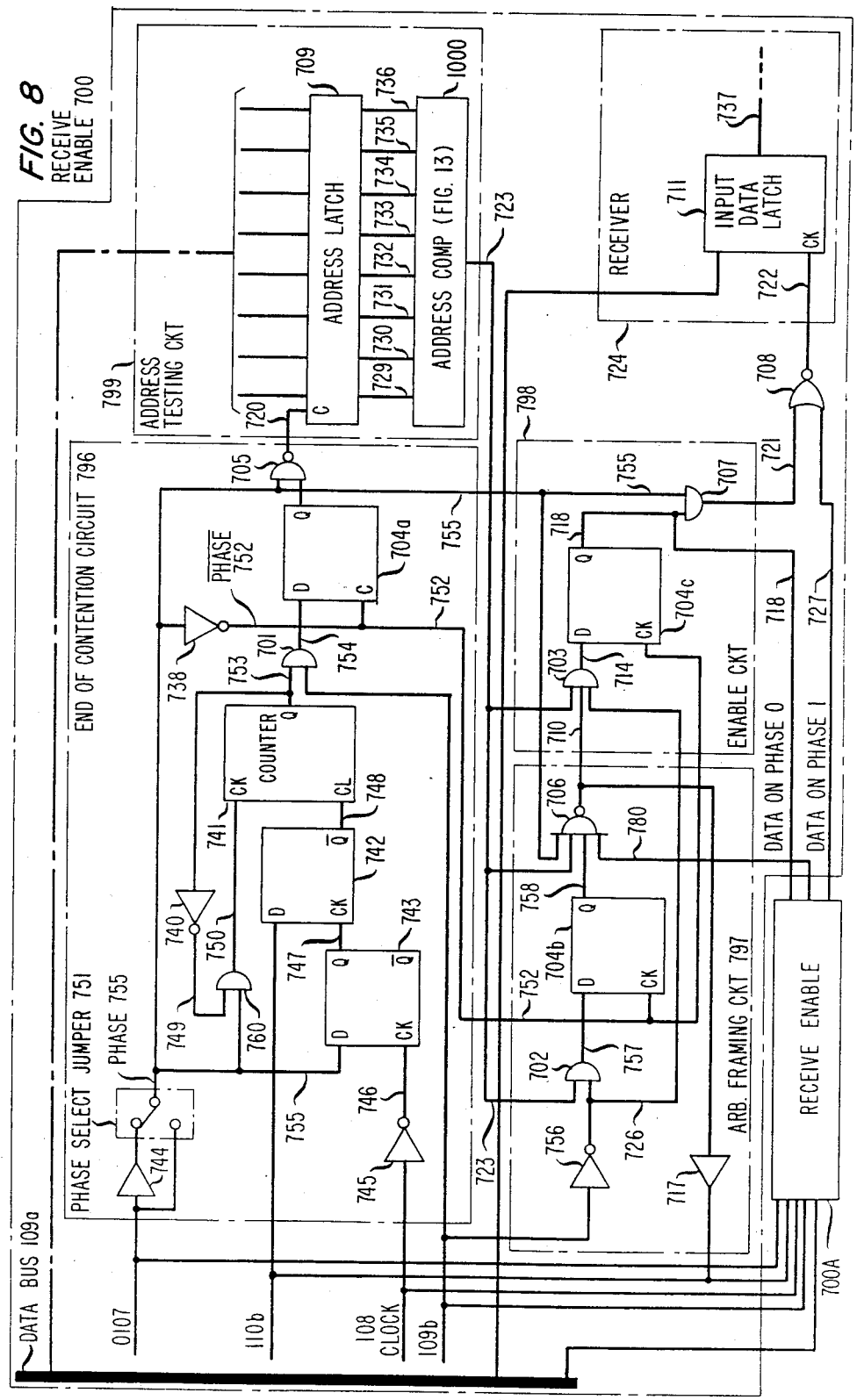

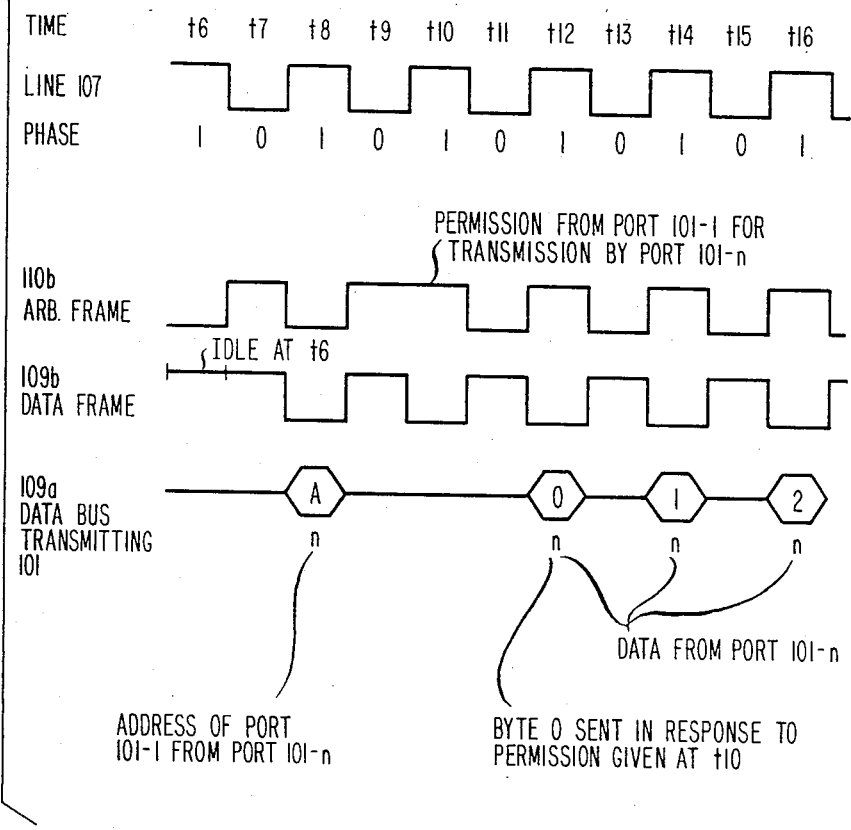

ADDRESS COMPARATOR

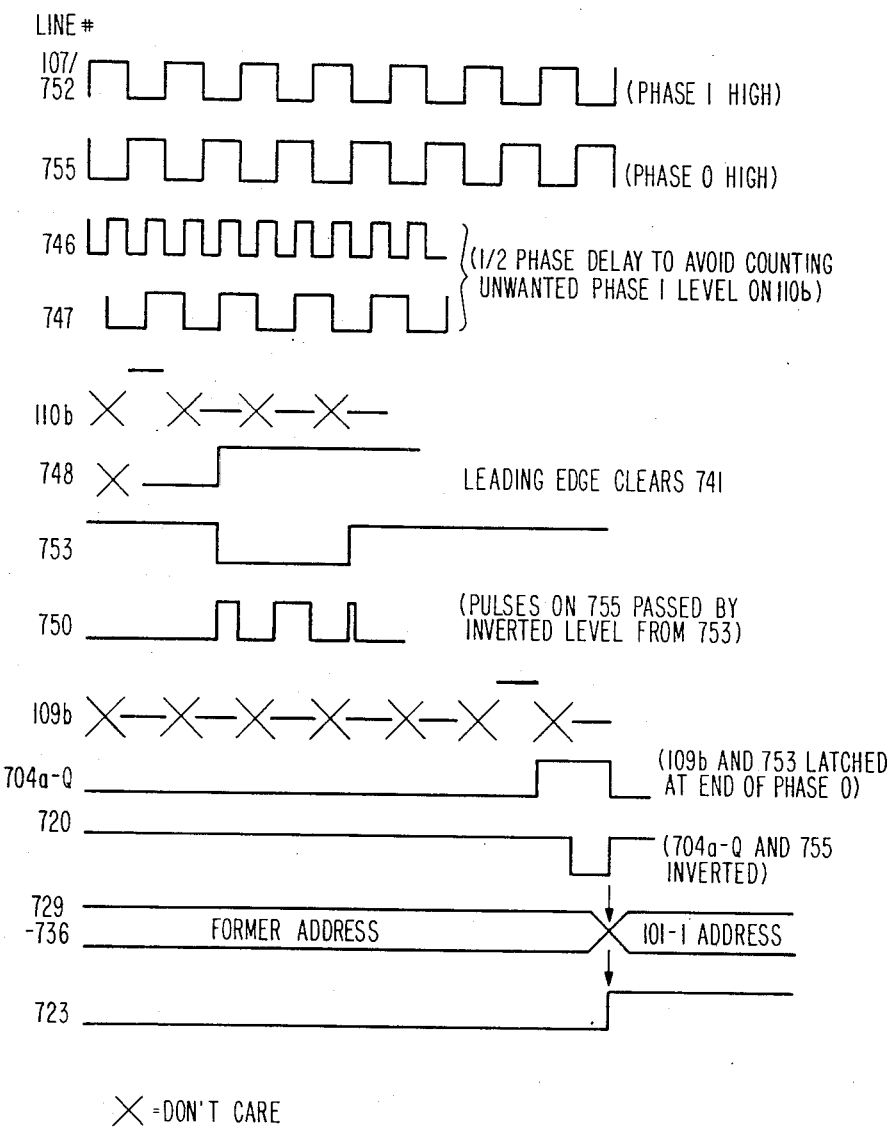

MULTIPHASE PACKET SWITCHING SYSTEM

FIELD OF THE INVENTION

This invention relates to a packet switching system.

BACKGROUND OF THE INVENTION

It is the continuing goal of designers to increase the rate at which data can be transmitted over a packet switching system. Early packet switching systems comprised a single bus or coaxial cable which was used for all system functions. These systems were inherently slow since the cable was relatively long and had to be used for all system functions including, data transmission, arbitration and the exchange of control signals between ports.

The subsequently developed multibus packet switching systems provided increased data throughput. The reason for this was that the provision of the plurality of busses permitted the data transmission function, the arbitration function and control function to be accommodated over separate paths. This permitted the data bus to be used only for data transmission. Also, the provision of separate paths permitted arbitration and data transmission to take place concurrently. These improvements increased the system throughput. Systems of the multibus type are shown in U.S. Pat. No. 4,470,112 of Sept. 4, 1984, to J. O. Dimmick.

In the Dimmick type systems, data throughput is limited by the time required for the transmitting and receiving ports to perform their required system functions. Thus, for examle, a transmitting port requires a finite amount of time to read data out of the port's memory and apply it to the system data bus. Also, the receiving port requires a finite amount of time to receive the data sent to it over the bus and to enter this data into the port's memory device. The time required by the ports plus the but transit time is termed the system data transfer cycle.

The transit time required for the data to be transmitted over the bus is relatively short and is only a fraction of the time required by the transmitting and receiving ports to process the data. The system data throughput cannot be increased merely by increasing the system clock rate. If the ports are well designed and already operating at their capacity, an increase in the clock rate would only increase the error rate since the ports cannot process data any faster than they already are.

It is possible in certain specialized situations and systems that a port's data processing rate might be increased by the use of special high speed circuitry or devices. However, the use of such expedients is costly and, even then, can provide only a limited increase in data throughput.

SUMMARY OF THE INVENTION

Our invention overcomes above discussed disadvantages and problems by providing a packet switching system in which data throughput is increased by subdividing each system transfer cycle time into a plurality of phases. Each phase serves a data transmission between a different pair of system ports. In the typical packet switching system, the time required to transmit data over the bus is about 12% of the transfer cycle duration. The rest of the transfer cycle duration represents the time required for the ports to process the transmitted and received data. This means that the data bus is busy 12% of each time slot duration and is idle and providing no useful function the remaining 88% of the time. It is for this reason that, in a well designed system in which the ports are already operating at their maximum data rate, the data throughput cannot be increased by merely increasing the clock rate. The provision of a plurality of phases per transfer cycle, in accordance with the invention, permits increased data throughput by permitting the data bus to be used a corresponding plurality of times each transfer cycle to transmit data.

In our system, a transmitting port is assigned to a particular one of a plurality of phases when it first requests data bus access. It contends with other requesting ports for bus access during its assigned phase and, after winning access, transmits data to a receiving port during subsequent occurrences of the same assigned phase. Assume for example that a port having data to transmit is assigned the phase 0 of a system having "n" phases. The port first contends for data bus access during occurrences of phase 0. After winning contention, it transmits data during subsequent occurrences of phase 0. Other ports can be served for contention and transmission during the same system transfer cycle by the remaining $n-1$ phases. If $n=8$, 8 phases are provided and our packet switching system can accommodate 8 different data transmission between different pairs of ports each transfer cycle. This effectively increases the system data throughput by the factor of 8 without the necessity of using expensive high speed circuitry or devices.

Our system is of the multibus type in that arbitration, control and data transmission take place over separate paths. We use certain of the various separate conductor paths as a signalling medium so that the transmitting and receiving ports can exchange signals indicating whether transmission can proceed immediately after arbitration or, should be temporarily delayed because the receiving port is busy receiving data on another phase.

The use of the above described techniques provides a packet switching system that has a greatly increased data throughput over prior arrangements without the use of costly high speed circuitry or devices.

BRIEF DESCRIPTION OF THE DRAWING

The invention may be better understood from a reading of the following detailed description taken in conjunction with the accompanying drawings in which:

FIG. 7 illustrates details of data framing circuit 600; for a two-phase system;

FIG. 8 illustrates details of receive enable circuits 700 and 700A for a two-phase system;

FIG. 9 through 12 and 14 are system timing diagrams, and

DETAILED DESCRIPTION

Figure 1:
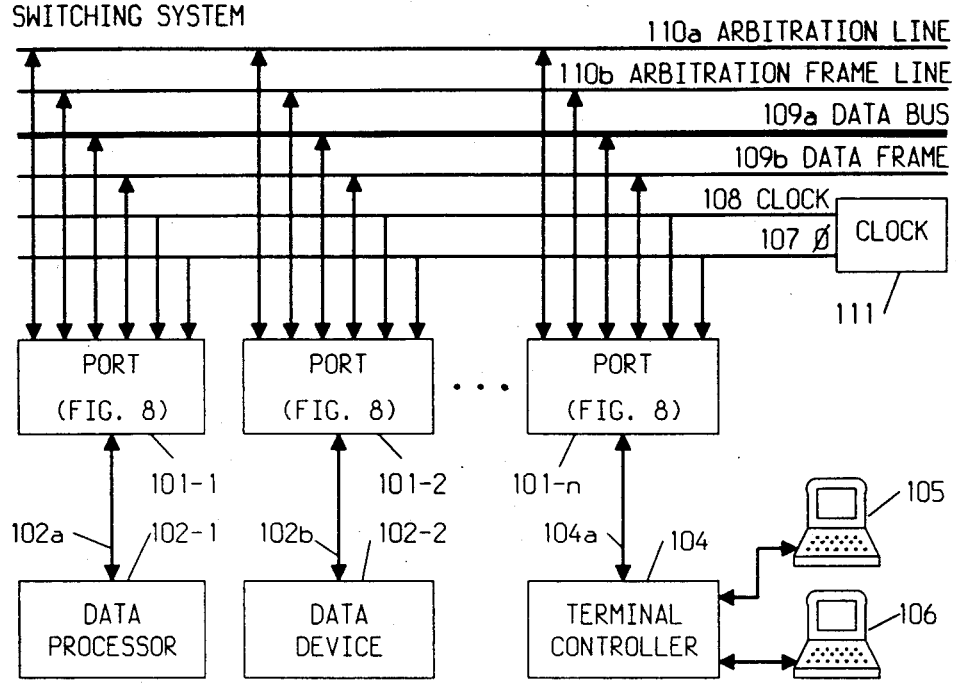
FIG. 1 illustrates a packet switching system representing one possible exemplary embodiment of the invention.

FIG. 1 discloses a packet switching system embodying the present invention. Shown on, FIG. 1 are ports 101-1 through 101-n, data processor 102-1, data device 102-2, terminal controller 104, terminals 105 and 106, clock 111, data bus 109a and various other lines interconnecting these components. The other lines include arbitration line 110a, arbitration frame line 110b, data frame line 109b, clock line 108, and phase line 107. Data bus 109a comprises enough lines to carry a parallel byte of data.

The port contention and arbitration process is assumed to be of the distributed allocation type described by U.S. Pat. No. 4,470,112 to J. O. Dimmick of Sept. 4, 1984. Contending ports sequentially apply the digits of their assigned priority number to arbitration line 110a. The value of the largest bit applied (0 or 1) by a contending port is carried by the line. Each contending port (101) compares the value of the bit it applies with the value of the bit currently on line 110a and drops out of contention if the value of the line is higher. The process continues bit by bit and the contending port with the highest priority number is the only one remaining at the end of the contention process. It is the port that is granted data bus access.

Multiphase Bus Arbitration

The disclosed system is a distributed type packet switching system that does not have a central switch. The multiphase concept is described as it applies both to bus arbitration and data transmission. The disclosed system is shown as having two phases for purpose of understanding. This showing is not by way of limitation and, if desired, an actual system could have a greater number of phases, such as 8 phases.

A phase is indicated by a high or low on the phase line 107 of FIG. 1. Clock 108 is synchronized to two times the phase period since the disclosed system has two phases. Assume that a low signal on line 107 indicates phase 0 and a high indicates phase one. A port 101 may contend for data bus access during phase 0 by applying its assigned priority number to arbitration line 110a while the signal on line 107 is low. Alternatively, a port 101 may contend for phase one by applying its priority number to line 110a while line 107 is high. A port 101 that wins contention during a given phase transmits a destination port address and then data over data bus 109a during subsequent occurrences of the assigned phase.

A destination or receiving port 101 is not fast enough to receive data from two different transmitting ports concurrently. There is therefore provided a means for a receiving or destination port to be able to delay data transmission from a phase 0 transmitting port if the destination port is currently busy accepting data from a phase one transmitting port. Thus, if a receiving port 101 reads its address on bus 109a during a second phase while it is currently receiving data during a first phase, it prohibits the sending port 101 assigned to the second phase from transmitting data to it until the transmitting port assigned to the first phase finishes its transmission.

Overall Description of Port 101

Figure 2:
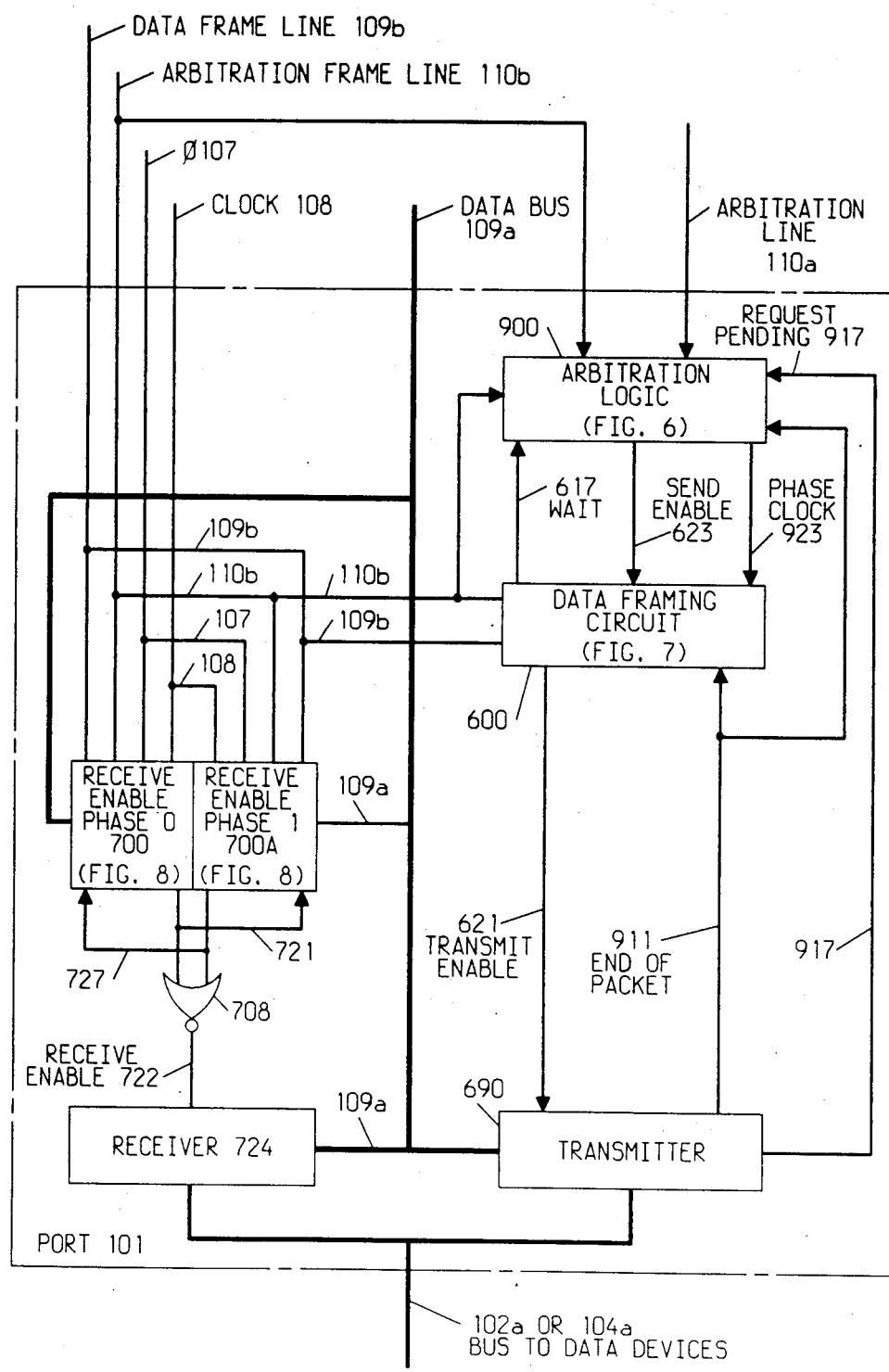
FIG. 2 illustrates the components of an example port.

FIG. 2 discloses details of a port 101 of FIG. 1. The port comprises a receiver 724 and a transmitter 690. It further comprises the elements that make possible the transmission and reception of data on bus 109a only during an assigned phases. These elements are receive enable circuits 700 and 700A, arbitration logic 900, and data framing circuit 600.

Data Transmission by Port 101

The contention and transmission process starts when transmitter 690 receives data from a device served by the port of which the transmitter is a part. Assume FIG. 2 depicts port 101-n of FIG. 1. The data to be transmitted comes from terminals 105 or 106 via controller 104, and bus 104a and is entered into transmitter 690. A request pending signal is then sent by transmitter 690 over line 917 to arbitration logic 900 on FIG. 2 to initiate contention. Arbitration logic 900 monitors arbitration frame line 110b to await a high signal indicating that arbitration may begin for an idle phase. An idle phase is assigned to the port when the high signal appears on line 110b concurrently with a high request pending signal on line 917. Arbitration logic 900 then contends for data bus 109a access on behalf of its port during its assigned phase.

Figure 9:
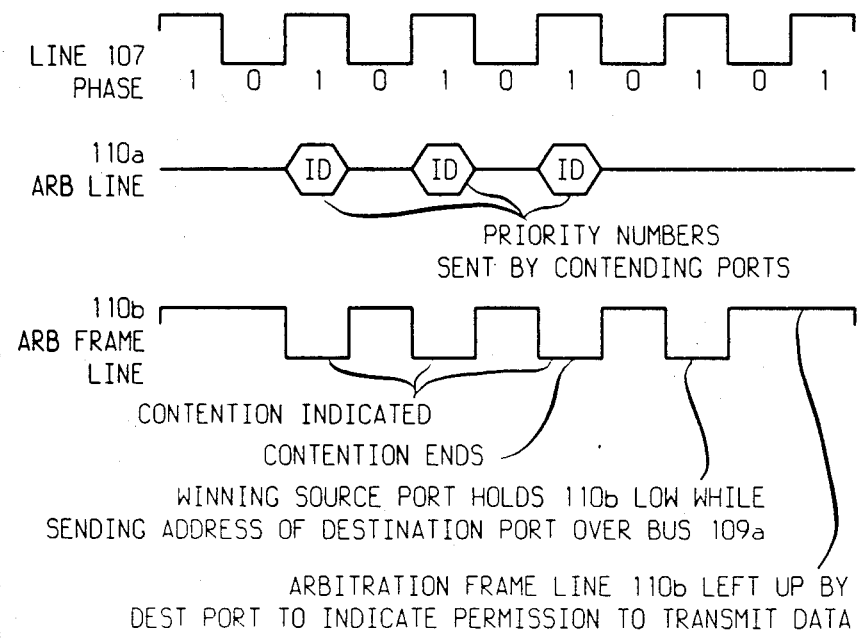

FIGS. 2 and 9 together, disclose further details of the arbitration process. FIG. 9 illustrates contention activity on lines 107, 110a and 110b. The illustrated action takes place within the alternating phases of line 107 which is labeled according to arbitrarily numbered units of time t0 through t10. A synchronizing pulse train that is high during phase 1 and low during phase 0 is shown for phase line 107. An arbitration framing signal, subsequently described, is shown for line 110b. The signal on arbitration line 110a, which may be high or low depending on the priority number of the contending ports, is indicated by hexagrams on FIG. 9.

It is shown on FIG. 9 that no port 101 is drawing arbitration frame line 110b low during phase 1, time t0. The high signal on line 110b at time t0 indicates that line 110a is currently idle and that arbitration for access to data bus 109a may begin. The described arbitration that follows is for the right for a port to transmit data over data bus 109a during phase 1.

The coincidence of high signals on lines 110b and 917 of FIG. 2 during a phase 1 occurrence assigns a contending port to phase 1 as later described at time t0. This causes arbitration logic 900 to generate a high phase 1 clock signal on line 923 (FIG. 2) during each assigned phase 1 occurrence to synchronize arbitration and transmission by the port during phase 1. During each of the next three occurrences of phase 1, times t2, t4, and t6 of FIG. 9, the contending port 101 draws low arbitration frame line 110b and sequentially applies the digits of its assigned port priority number to arbitration line 110a.

Assume a 3 digit port priority number for the disclosed system. The contention for data bus 109a access is won during time t6 when the third digit of its priority number is applied and arbitration logic circuit 900 of each contending port 101 determines whether its port won or lost. Assume port 101-n wins contention. Arbitration circuit 900 of port 101-n then applies a "send enable" signal over line 623 of FIG. 2 through data framing circuit 600 to transmitter 690 over "transmit enable" line 621. The receipt of this signal causes transmitter 690 to apply the address of the destination port to data bus 109a. The transmission process is shown on FIG. 10.

FIG. 10 discloses a continuation action of the action shown on FIG. 9. Arbitration line 110a is not shown on FIG. 10 since arbitration is finished at time t6 and is of no further relevance. The signals on data bus 109a are indicated by hexagrams on FIG. 10. Characters within the hexagrams depict the nature of the data being sent. "A" represents a destination port address, and "0" through "2" represent bytes 0 through 2 of the data being sent. The "n" below each hexagram indicates transmision by port 101-n.

Figure 3:
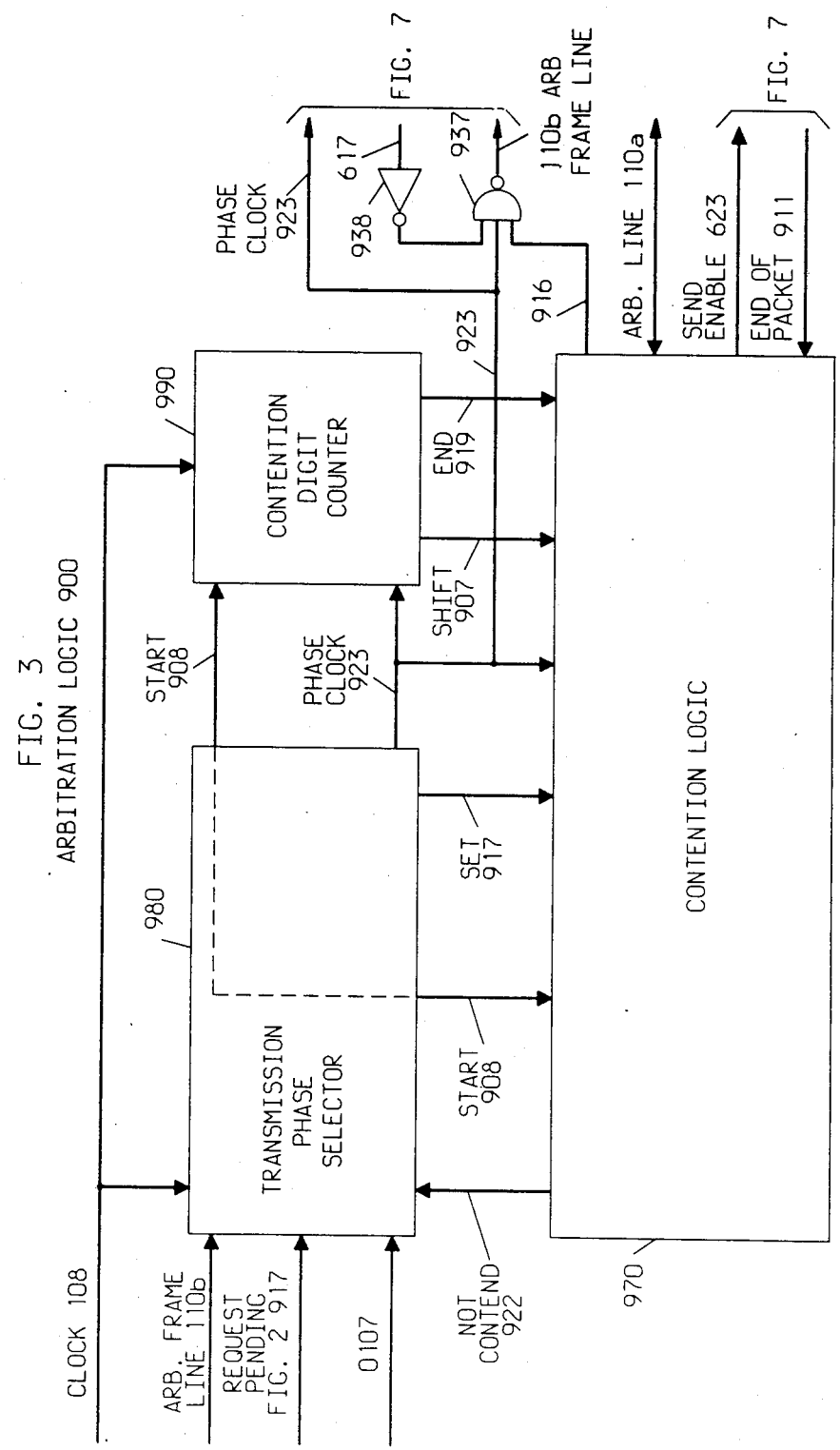
FIG. 3 illustrates the arbitration logic element 900.

Contention having taken place as described, and it having been determined at time t6 that port 101-n wins, port 101-n sends over bus 109a the address of the destination port, say that of port 101-1 of FIG. 1, during time t8 of FIG. 3. As shown on FIG. 10, at t6 (phase 1) the data frame line 109b is idle and at t8 the destination port address is applied to data bus 109a. The phase clock signal on line 923 of FIG. 2, synchronizes transmission by the port to only phase 1 occurrences.

Recall that during time t6 when port 101-n wins contention, a send enable signal is sent by arbitration logic 900 (FIG. 2) over path 623 to data framing circuit 600. A resulting transmit enable signal is sent by data framing circuit 600 over line 621 during time t8 to cause transmitter 690 to apply the address of destination port 101-1 to data bus 109a during time t8. Also, data frame line 109b is drawn low by data framing circuit 600 of port 101-n at the beginning of transmission to indicate to the rest of the system that data bus 109a is currently in use during phase 1. Arbitration logic 900 of port 101-n simultaneously draws low arbitration frame line 110b to prevent another contention during phase 1, for the time being, and to indicate that the destination address is being transmitted. These actions on lines 109b and 110b are shown on FIG. 10 to occur during time t8.

Each port 101 comprises receive enable circuits 700 and 700A. Circuit 700 serves phase 0. Circuit 700A serves phase 1. The receive enable circuits 700A of all ports 101 test the port address applied at time t8 by transmitting port 101-n to data bus 109a as subsequently described. Data frame line switches from a high to a low at time t8. The receive enable circuit 700A of the addressed port 101-1 recognizes the presence of its address on data bus 109a and responds in either one of two ways. If the addressed port 101-1 is currently busy on another phase (phase 0), the signal on arbitration frame line 110b is drawn low to prevent transmission by transmitting port 101-n. If the addressed port 101-1 is currently idle, its receive enable circuit 700A responds by leaving line 110b high to indicate a permission to transmit to port 101-n. Such a high signal is shown on FIG. 10 to be on arbitration frame line 110b during time t10. Time t10 is the next occurrence of phase 1 after the destination port address transmision at t8. Data framing circuit 600 of transmitting port 101-n next applies to data bus 109a a set of three data bytes (FIG. 10) during the next three occurrences of phase 1 (t12, t14, t16). This action by port 101-n occurs in response to the high signal on arbitration frame line 110b during time t10.

With reference to time t10 and FIGS. 9 and 10, data framing circuit 600 of transmitting port 101-n detects the high signal on arbitration frame line 110b at time t10 and, in response, sends a transmit enable signal over line 621 (FIG. 2) to transmitter 690 during the next phase 1 occurrence (t12). Transmitter 690 receives signal 621 and applies one byte of data over bus 109a at time t12. Data framing circuit 600 continues to send transmit enable signals over line 621. This causes transmitter to apply the remaining two bytes of the packet data over data bus 109a at times t14 and t16.

Transmitter 690 sends an end-of-packet signal over line 911 when the last byte is readout of port 101-n to indicate to data framing circuit 600 of port 101-n that the port's entire data packet has been transmitted. The end-of-packet signal is applied to both data framing circuit 600 and arbitration logic 900. It signals that transmission has ended by port 101-n. In response to the end-of-packet signal on line 911, data framing circuit 600 turns off its transmit enable signal on line 621 and signals all other ports that transmission by port 101-n is finished by allowing data frame line 109b to go high at end of t16. Arbitration logic 900 turns off the send enable signal on line 623 and the phase clock signal on line 923 upon receipt of end of packet signal 911. The end-of-packet signal 911 also resets arbitration logic 900 so it may contend again for data bus access on behalf of its port 101-n. Signal 911 also resets data framing circuit 600 of port 101-n so it is ready to enable transmission when port next wins data bus access.

Data Reception by Port 101

Consider now contention and data transmission from the viewpoint of the receiving port. Assume on a transmission from port 101-n, that to port 101-1 FIG. 2 represents port 101-1 for this description.

Receive enable circuits 700 and 700A of receiving port 101-1 produce two outputs as subsequently described. They hold low arbitration frame line 110b to prevent transmission by sending port 101-n if the receiver of port 101-1 is busy on another phase. Receive enable circuits 700 and 700A also, provide a signal on line 722 (FIG. 2) that latches the data received from port 101-n on data bus 109a into receiver 724 of port 101-1. The sequence of operation of receive enable circuit 700A follows.

Return to FIGS. 9 and 2 for the following description. Receive enable circuit 700A responds only to events occurring during phase 1. When idle, receive enable circuit 700A monitors arbitration frame line 110b waiting for a sign of contention. The beginning of a contention operation is indicated to all ports when the signal on arbitration frame line 110b is high during one phase 1 occurrence and low during the next phase 1 occurrence. Such a sequence is shown on FIG. 9 for times t0 and t2. Contention by port 101-n takes place durng t2, 4, 6. This is detected by the receivers of all ports and, as a result, a counter in circuit 700A of each port is set during time t2. The counter counts times t4 and t6. After the count at t6, receive enable 700A of all ports awaits an indication on line 109b of a transmission on data bus 109a.

Recall that the data framing circuit 600 of transmitting port 101-n draws low the signal on data frame line 109b during data transmission. The first phase 1 occurrence of this low (t8) on line 109b follows arbitration and indicates to circuit 700A of receiving port 101-1 that an address is being transmitted durng time t8. The address of port 101-1 is shown on FIG. 10 to be transmitted during time t8. Receive enable circuit 700A of port 101-1 compares the address on data bus 109a to the assigned address of port 101-1 during time t8. If they are the same, port 101-1 is the destination port for the data that follows.

Receive enable circuit 700A of port 101-1 now tests line 721 (FIG. 2) to see if receive enable circuit 700 indicates that data are currently being received by port 101-1 during the other phase (phase 0). At time t8, receiver 724 of port 101-1 is assumed to be idle, so it is shown on FIG. 10 that receive enable circuit 700A allows the signal on arbitration frame line 110b to go high during time t10. This is the signal awaited by data framing circuit 600 of transmitting port 101-n that causes it to enable transmission. This high on line 110b acknowledges the receipt of its address by port 101-1 and makes the receiver of port 101-1 busy to the other phase.

It is a different situation, however, if receiver 724 of port 101-1 is busy receiving a transmission on one phase when it is addressed during another phase. Assume now that receiver 724 of port 101-1 is busy with a transmission during phase 1. Consider the effect when a transmitter in another port, such as 101-2, addresses port 101-1 during phase 0.

The high signal on arbitration frame line 110b shown on FIG. 10 during time t9 makes possible a contention for the use of data bus 109a by another port during phase 0. Assume that port 101-2, now contends with other ports 101 as shown on FIG. 11, and wins the right to transmit at time t15. Assume port 101-1 receives its address on bus 109a at time t17 from port 101-2 (FIG. 12). Receive enable circuit 700 of port 101-1 tests the address on data bus 109a and finds that the address received from port 101-2 to be address of its port 101-1. Receive enable circuit 700 of port 101-1 tests line 727 to see if receiver 724 of its port is currently busy receiving data during phase 1. Assume it is now busy and that at time t19 receive enable circuit 700 of port 101-1 draws low arbitration frame line 110b to forbid further transmission by port 101-2 during phase 0 for the time being.

Figure 11:
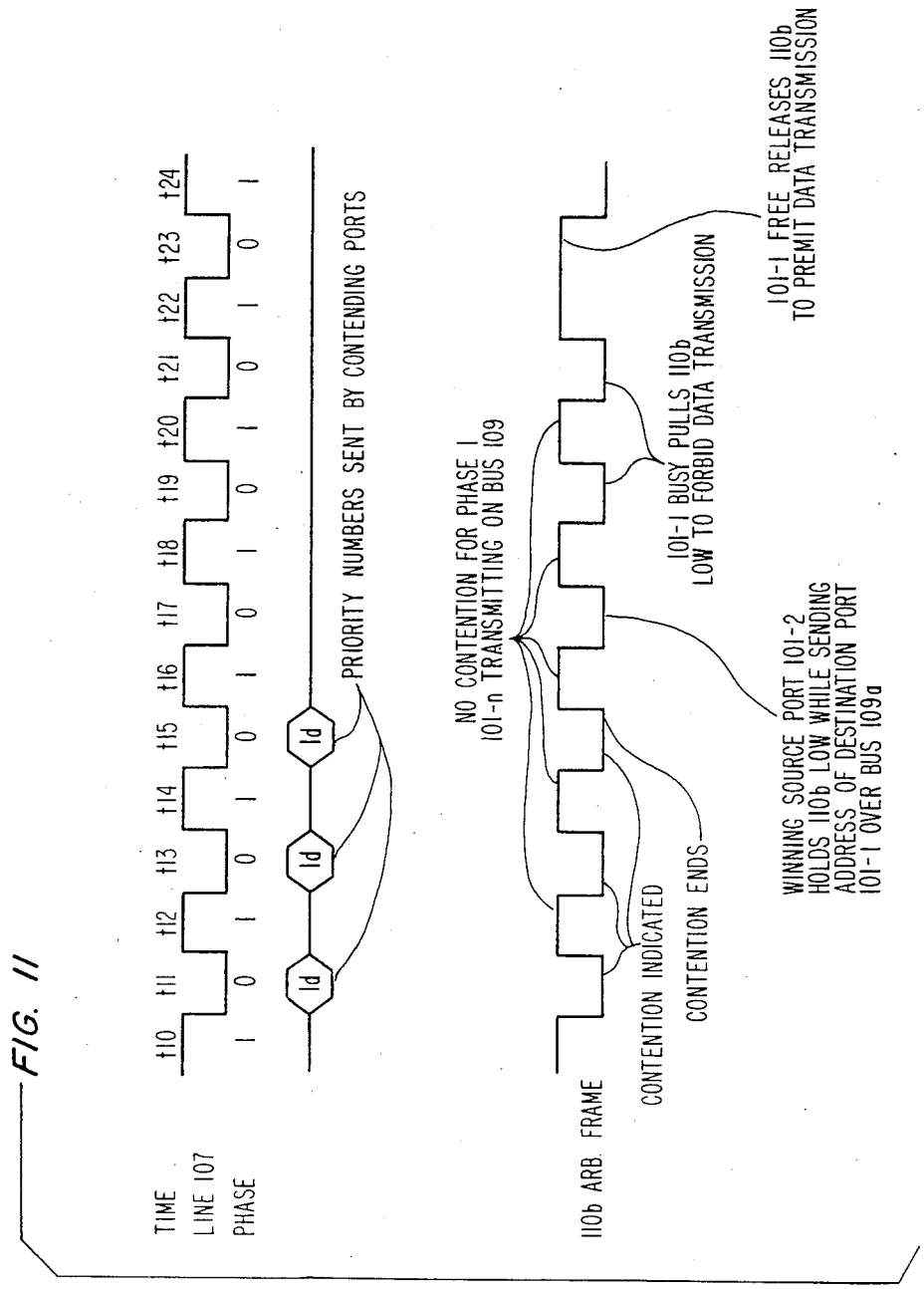
Figure 12:
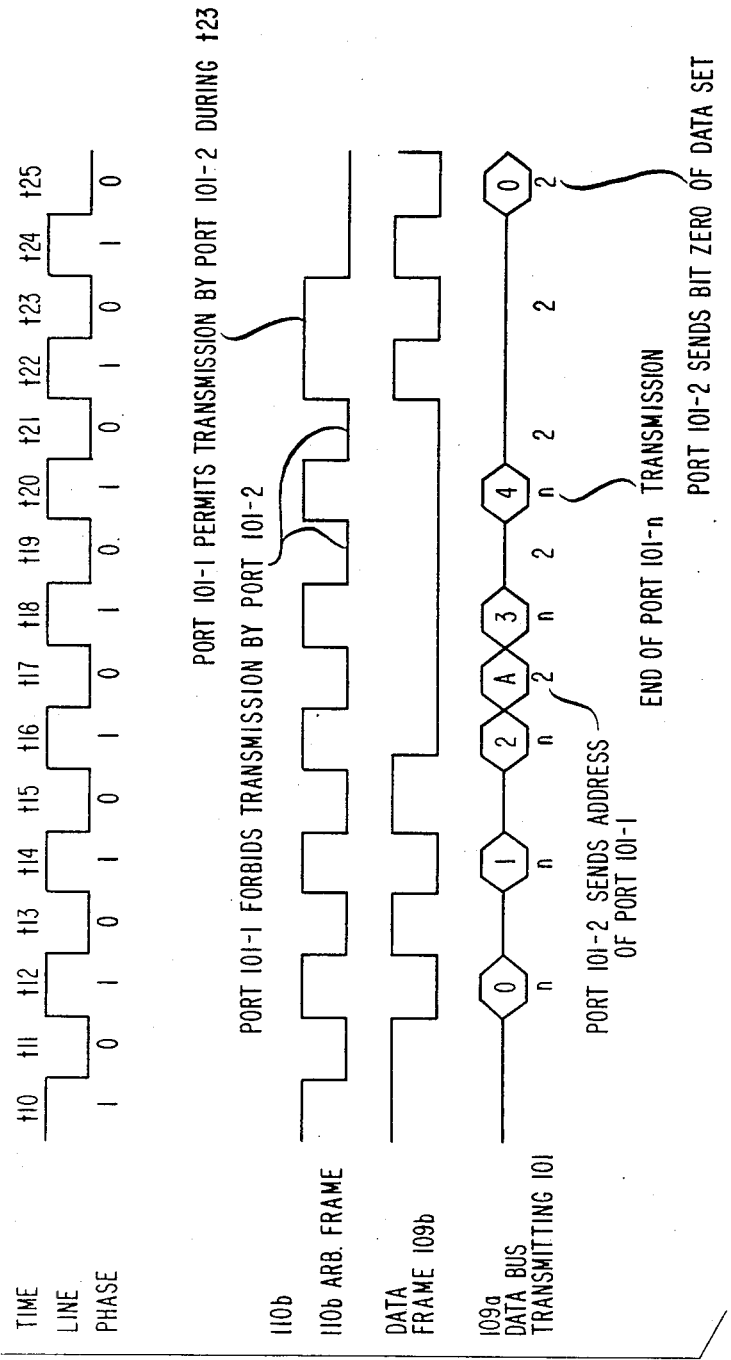

The sequence just described is shown on FIGS. 11 & 12. The address of receiving port 101-1 is shown to be on data bus 109a during time t17. The arbitration frame signal on line 110b is held low during time t17 by transmitting port 101-2. During the next occurrence of phase 0, time t19, the arbitration frame line is held low by receive enable circuit 700 of receiving port 101-1. The low arbitration frame line signal during time t19 prevents transmission by port 101-2. This is done by signalling the data framing circuit 600 of transmitting port 101-2 over line 110b that receiver 724 of destination port 101-1 is busy receiving data during phase 1.

Return now to the phase 1 example where port 101-n is transmitting. The last byte (assuming a four byte packet) from sending port 101-n is shown on FIG. 12 to be transmitted to port 101-1 during time t20. At the end of time t20, sending port 101-n allows the signal on data frame line 109b of FIG. 2 to go high for phase 1. This signals the end of transmission by port 101-n to receive enable circuit 700A of receiving port 101-1.

During phase 0 at time t21 of FIG. 12, receive enable circuit 700A of port 101-1 prepares to permit transmission by port 101-2 as subsequently described. It permits transmission by allowing the signal on arbitration frame line 110b to be high during phase 0 at time t23. Consequently, transmitting port 101-2 now sends byte 0 of its packet of data during time t25, phase 0 as shown on FIG. 12. Other bytes follow on subsequent phase 0 occurrences.

Overall Description of Arbitration Logic 900

The major elements of the arbitration logic 900 of FIG. 2 are shown on FIG. 3. Arbitration logic 900 comprises contention logic 970, transmission phase selector 980, and contention digit counter 990.

A detailed description of FIG. 3 follows, but generally, the major elements of arbitration logic 900 interact as follows. With a high on lines 917 and 110b, transmission phase detector 980 starts the application of a contending port's priority digits to the arbitration line 110a by sending a signal over path 908 to counter 990 and logic 970. Transmission phase selector 980 synchronizes the application of the port priority digits to the arbitration line 110a by sending a pulse train during each occurrence of the assigned phase to elements 970 and 990 on phase clock line 923. Contention logic 970 contends with other contending ports by applying its port's assigned priority digits to the arbitration line 110a. Contention logic 970 also arbitrates the results of each digit applied according to the digit value then carried by line 110a. Contention digit counter 990 halts the application of port priority digits to arbitration line 110a when contention is resolved.

The following describes the above summarized operations in further detail. Arbitration begins when high signals on lines 110b and 917 are applied to transmission phase detector 980 to indicate that its port is requesting data bus access and that arbitration bus 110a is free. Detector 980 assigns its port to an idle phase at this time. Assume phase 1 is assigned. Transmission phase selector 980 initializes contention digit counter 990 and contention logic 970 with a "start" signal on line 908. After the start signal 908, a phase clock signal on line 923 is applied each phase occurrence by transmission phase detector 980 to synchronize contention to the assigned phase 1. The pulses of the phase clock 923 are counted by contention digit counter 990, and they synchronize the application of port priority digits by contention logic 970 to arbitration line 110a. The number of digits applied to the arbitration line 110a is counted by contention digit counter 990 which stops arbitration with a signal on "end" line 919 at the end of contention. This is true regardless of whether the port does or does not win contention.

More specifically, transmission phase selector 980 responds when arbitration frame line 110b and request pending line 917 are both high. The high on arbitration frame line 110b indicates that arbitration may begin. The high on request pending line 917 indicates that there are data for this port 101 to transmit. Together, they indicate that conditions are correct for the port to contend for the right to transmit data on data bus 109a. Transmission phase selector 980 further uses the presence of a high on both arbitration frame line 110b and line 917 during a particular phase to assign this port to a phase. Phase 1 is assumed for this description.

A high start signal is applied to line 908 upon the reception of coincident highs on lines 110b and 917. The start signal on line 908 initializes contention digit counter 990 and contention logic 970 so contention can proceed. Upon the next occurrence of the assigned phase, transmission phase selector 980 starts phase clock signal 923 so that it is high during each phase 1 occurrence. Contention digit counter 990 receives pulses on line 923 and applies a pulse train to shift line 907. Contention logic 970, in turn, applies port priority digits to arbitration line 110a that are synchronized by the pulse trains on lines 923 and 907. These digits are the port priority numbers already described in conjunction with FIGS. 2, 10, 11, and 12.

Assume that port 101-n contains the arbitration logic 900 illustrated on FIG. 3 and that it wins contention. The signal on line 916 to gate 937 from logic 970 remains high throughout contention and transmission by port 101-n. The signal on phase clock line 923 is high during each phase 1 occurrence throughout contention and transmission. Thus NAND gate 937 is primed with a high on two of its inputs during the assigned phase throughout contention and transmission. The signal on line 617 is low during contention. This signal holds the output of inverter 945 high. This high turns on gate 937 to hold arbitration frame line 110b low during contention and address transmission by gate 937.

This paragraph describes how a contending port 101 may lose contention. Assume now that a port 101 containing the arbitration logic 900 of FIG. 3 loses contention for data bus access. Contention logic 970 senses that the digit value on arbitration line 110a is higher than the priority number the contending port attempts to apply. This means that another contending port has a higher priority number. Logic 970 then sends a high signal over not-contend line 922 to selector 980. This drives the start signal low on line 908 and halts the phase clock signal on line 923. Setting the signal low on start line 908 also halts arbitration and resets elements 970, 980, and 990.

General Description of Data Framing Circuit 600

Figure 4:
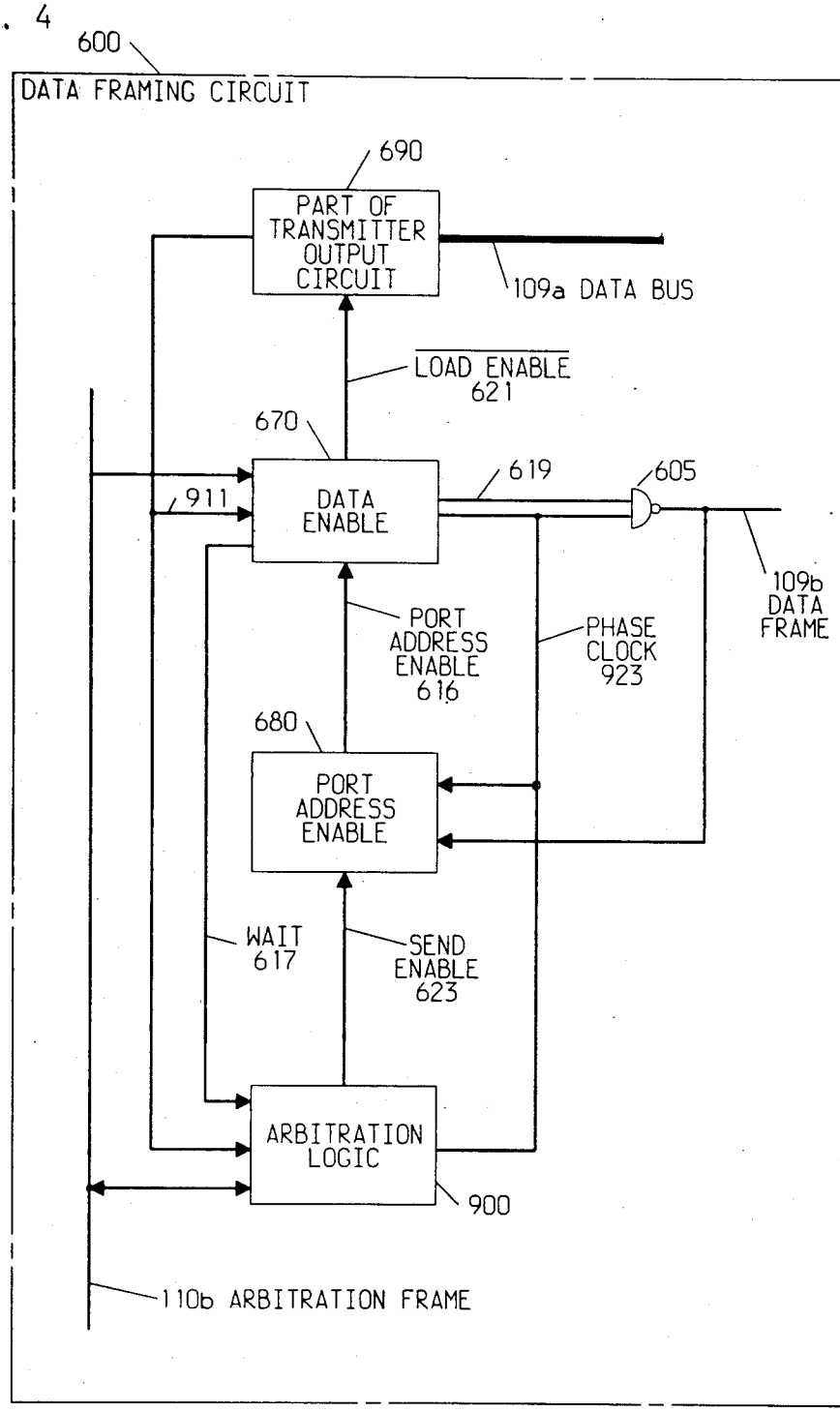
FIG. 4 illustrates the data framing circuit 600.

The major elements of the data framing circuit 600 are shown on FIG. 4. Data framing circuit 600 comprises port address enable 680 and data enable 670. These are shown on FIG. 4 along with part of arbitration logic 900 and part of transmitter output circuit 690.

A detailed description of FIG. 4 follows but generally, the major elements shown interact as follows. Arbitration logic 900 starts the port transmission process after contention as described in conjunction with FIG. 3 by a signal on lead 623. Port address enable 680 synchronizes address transmission. Data enable 670 delays data transmission by the sending port when the receiving port is busy. It enables data transmission when the receiving port is idle. The output circuit of port transmitter 690 transmits data over data bus 109a. It also halts transmission by applying an "end of packet" signal over line 911 to data enable element 670 when there are no more data to transmit in variable length packets.

The signal on phase clock line 923, described in conjunction with FIG. 3, synchronizes all operations of data framing circuit 600 so that transmission takes place only during the assigned phase. Arbitration logic 900 starts data transmission process by applying a signal over send enable line 623 to port address enable 680 as described in conjunction with FIG. 3. Port address enable 680 uses the signal on phase clock line 923 to synchronize the signal received on line 623. The resulting synchronized signal is applied to data enable 670 over port address enable line 616.

Data enable 670 receives signal 616 and immediately applies a high signal over line 619 to NAND gate 605. Thus primed, NAND gate 605 uses the signal on phase clock line 923 to draw low data frame 109b during each occurrence of the assigned phase during transmission by the port. This low on data frame line 109b indicates to the system that that phase is currently in use. Data enable 670 also sends one load/enable pulse over line 621 to cause transmitter output circuit 690 to apply the address of the destination port 101-1 to data bus 109a.

Next, data enable element 670 waits for the addressed destination port 101-1 to apply a high logic signal to arbitration frame line 110b to indicate that permission for sending port 101-n to transmit is granted. When this permission is received, data enable element 670 causes transmitter output circuit 690 apply its data to data bus 109a. Data enable 670 does so by sending load enable logic pulses to transmitter output circuit 690 over line 621. Transmitter output circuit 690 applies one byte of data to data bus 109a for each such pulse received from data enable 670. When the last byte of a packet has been sent, transmitter output circuit 690 returns an "end of packet" pulse over line 911 that turns off and resets both data enable 670 and arbitration logic 900. Having been thus reset, these elements are ready to start another transmission sequence like the one just described.

Overall Description of Receive Enable Circuit 700

Figure 5:
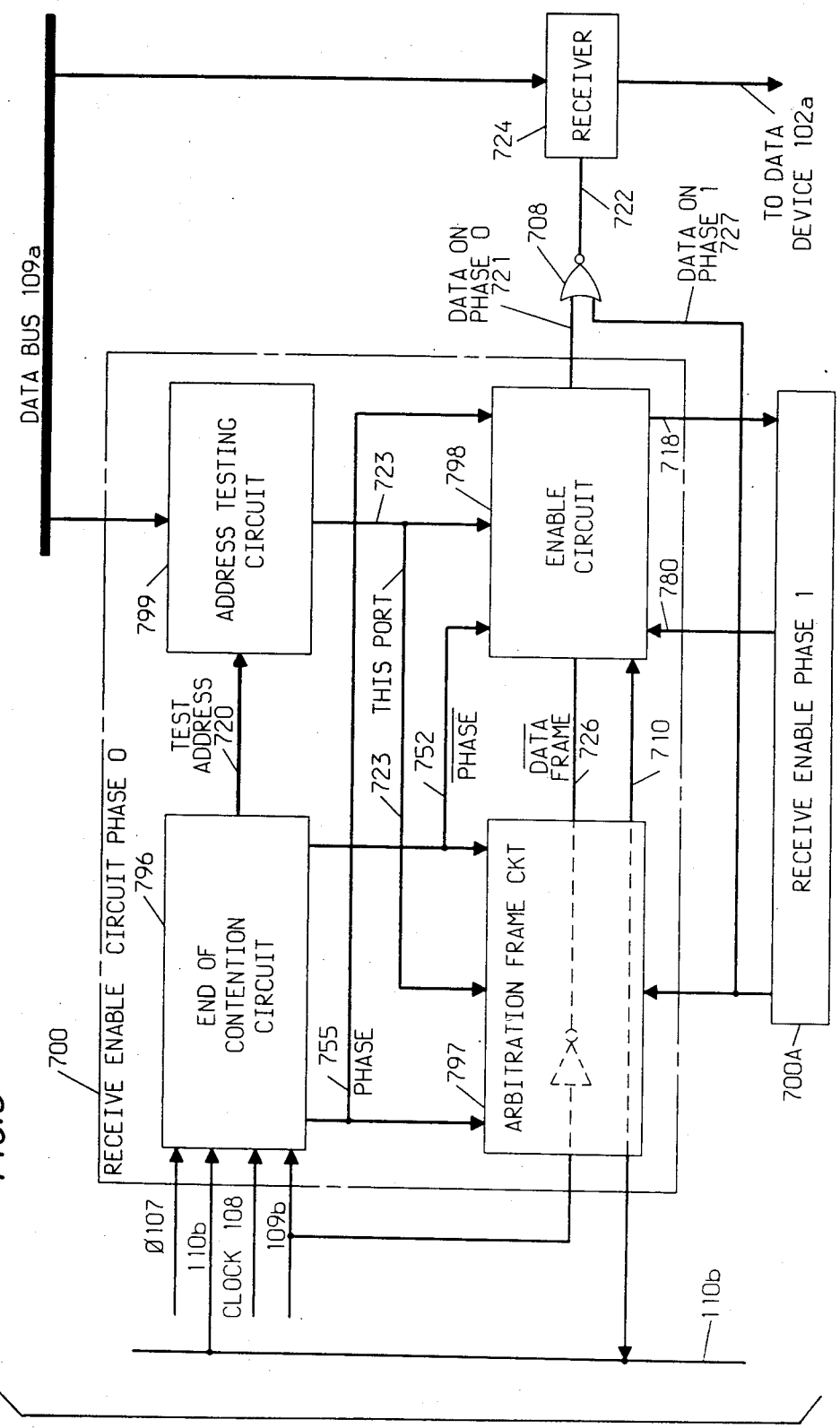
FIG. 5 illustrates the receive enable circuits 700 and 700A.

The major elements of the receive enable circuit 700 are shown on FIG. 5. Receive enable circuit 700 comprises end of contention circuit 796, arbitration framing circuit 797, enable circuit 798, and address testing circuit 799. These major elements are shown on FIG. 5 along with receive enable circuit 700A and part of a receiver 724. Each receive enable circuit 700 and 700A in a port 101 is assigned to serve the port's receiver 724 during a single assigned phase. In the disclosed example, circuit 700 serves phase 0, circuit 700A serves phase 1.

End of contention circuit 796 produces timing signals and other signals for the elements of receive enable circuit 700. The purpose of these signals is given below. End of contention circuit 796 produces two timing pulse trains synchronized with assigned phase 0 of receive enable circuit 700. Each pulse train is a compliment of the other and they appear on lines 755 and 752. These pulses keep the other circuits timed to phase 0 occurrences. In response to a high signal on data frame line 109b and a low on arbitration frame line 110b, end of contention circuit 796 produces a pulse that appears on path 720 simultaneously with a received port address on data bus 109a during phase 0. Address testing circuit 799 uses this pulse on line 720 to test the received port address on data bus 109a to determined whether it is the address of port 101-1 of which the circuit of FIG. 5 is a part.

The presence of an address on data bus 109a was described at the system level in connection with its occurrence at time t17 and elsewhere (FIG. 12). Here the address is present on data bus 109a during phase 0. Consistent with this example, assume that the port being described is port 101-1 and that its address is on data bus 109a.

Address testing circuit 799 of receiving port 101-1 applies a high logic level to line 723 in response to a detection of its address on data bus 109a during phase 0. This high signals indicates to arbitration framing circuit 797 and enable circuit 798 that a transmitting port, port 101-2 in the assumed example, is ready to send data to receiver 724 of receiving port 101-1 over data bus 109a during phase 0. At this point there exist the two possibilities described subsequently.

First, it is possible that receiving port 101-1 is currently busy receiving data from another port on phase 1. In this case, the phase 1 receive-enable circuit 700A is currently applying a high to line 780. This high disables enable circuit 798 and, by means of arbitration frame circuit 797, draws the level on arbitration frame line 110b low during phase 0. Recall that such a low prohibits data transmission during the affected phase. This state of the system is shown on FIG. 12 to occur at times t19 and t21.

Second, it is possible that the port is not currently busy receiving data from another port on phase 1 when it is addressed on phase 0. In this case, the phase 1 receive enable circuit 700A is currently applying a low to line 780. The level of arbitration frame line 110b is allowed to go high during the next phase 0 occurrence to signal the transmitter of transmitting port 101-2 to begin data transmission as already explained at time t23 of FIG. 12. Enable circuit 798 applies a series of pulses, beginning with the next phase 0 occurrence, over line 721 to receiver 724. Each pulse sent over line 721 clocks into receiver 724 a byte of data from data bus 109a. The first byte is byte 0 which is sent by port 101-2 over bus 109a during time t25 of FIG. 12.

Circuit Description of Port 101

Circuit Description of Arbitration Logic 900

Figure 6:
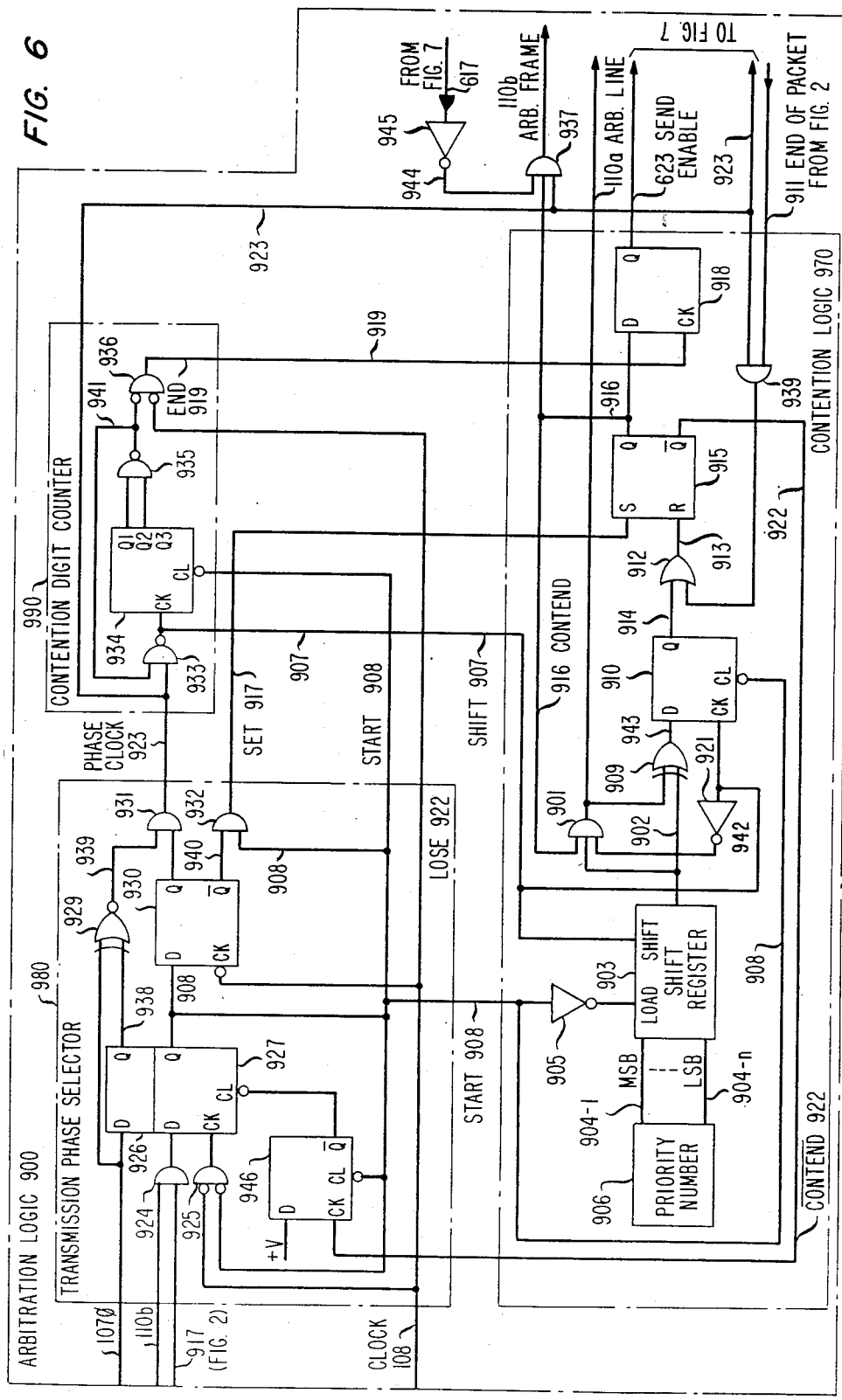
FIG. 6 illustrates details of arbitration logic element 900.

The arbitration logic is shown in detail on FIG. 6. Recall from the description of FIG. 3 that arbitration logic 900 comprises contention logic 970, transmission phase selector 980, and contention digit counter 990. Elements 970, 980, and 990 are shown enclosed by dotted lines on FIG. 6.

This provides a description of the general functions of the arbitration logic 900. Arbitration logic 900 responds as follows to indications on arbitration frame line 110b and request pending line 917 that there are data for the port to transmit and that one of the phases is idle and available for contention. Transmission phase selector 980 responds to these signals, assigns the first idle phase to arbitration logic 900 and sends a signal that is true during the assigned phase over line 923 (FIG. 6) to other elements of arbitration logic 900 and to data framing circuit 600 of FIG. 7. Phase selector 980 also sends start and shift signals to contention logic 970 (FIG. 6) to make element 970 apply port priority digits to arbitration line 110a.

Contention logic 970 compares the priority digits it applies to line 110a against the digits applied by the contending logic circuits of other ports to determine whether its associated port may be granted data bus access. If it is not granted, element 970 drops out of contention, resets selector 980 and the cycle just described is repeated. If the port wins contention, selector 980 indicates this to data framing circuit 600 over line 623, transmission is timed by the phase clock signal on line 923, and the elements of arbitration logic 900 do not reset until after transmission.

Transmission phase selector 980 responds when arbitration frame line 110b and request pending line 917 are both high to initiate a port contention operation. The high on arbitration frame line 110b indicates that arbitration line 110a is not busy and that arbitration may begin. The high on request pending line 917 indicates that there are data for this port 101-n to transmit. Together, they indicate that the port should now contend for access to data bus 109a. Arbitration logic 900 uses these signals as follows.

A high on arbitration frame line 110b during a particular phase means that contention may begin for data bus 109a access during that phase. Transmission phase selector 980 selects the first phase available for arbitration as follows. Until both inputs to AND gate 924 are high, a low from gate 924 is continually latched through data latch 927 to hold start line 908 low. This low on line 908 primes inverting AND gate 925 so that the pulses on clock line 108 are applied continually to the CK input of latch 927 to latch the low from gate 924 through latch 927 and the process continues. For stability, latching takes place in the middle of each phase occurrence because the signal on clock line 108 is the in phase second harmonic of the phase indicator signal on line 107.

When both lines 110b and 917 go high as already described, the resulting high from AND gate 924 is latched through latch 927 making start line 908 go high. Line 908 high represents the assignment of a phase to the port.

The high on start line 908 disables inverting AND gate 925 and makes its output low. This low halts the latching action of latch 927 by clock 108. Latch 926 is triggered by the same clock input as latch 927 so the level of the signal on phase line 107 at the time of the above described latching action that makes start line 908 high remains on line 938 when inverting AND gate 925 is disabled. The level on line 938 is low if latching is halted during a phase 0 occurrence and high if during a phase 1 occurrence.

Exclusive NOR gate 929 inverts the phase signal pulse train on line 107 if conditions for contention are fulfilled during phase 0. It does not invert the signal on line 107 if conditions for contention are fulfilled during phase 1. The output of gate 929 is high whenever its two inputs are equal. Regardless of what phase is assigned, the signal on line 939 is high during each occurrence of the assigned phase until start line 908 is drawn low at the end of transmission as subsequently described.

Transmission phase selector 980 also applies a set signal to line 917. To understand how the set signal 917 is generated, return to the time start line 908 was low before the contending port was assigned to a phase. A low on line 908 is clocked through latch 930 to cause a high on lead 940. At that time, AND gate 932 is already disabled at its lower input by the low on start line 908 and therefore, regardless of the high on line 940, the logic level of set line 917 remains low. When the start line 908 goes high as a phase is assigned, set line 917 goes high because the level on both lines 908 and 940 go high momentarily. The next low going clock pulse on line 108 latches the high on line 908 through latch 930 to cause line 940 to go low. This low disables AND gate 932 and applies a low to lead 917. So a single pulse is generated on set line 917 that is high between the time the logic level on start line 908 first goes high and the time the logic level on line 940 goes low. In summary line 917 goes high when a port is first assigned to a phase and goes low during the next phase occurrence.

In summary, three signals are generated by transmission phase selector 980. These are: a high start signal on line 908 that starts contention by logic 900 and stays high throughout contention and transmission to prevent further contention by the port 101-1; a single set pulse on line 917 that enables contention by its port; and a phase clock signal on line 923 that identifies the assigned phase being contended for by arbitration logic 900. It is subsequently explained how the pulses on line 923 and signal on line 908 are turned off.

Contention digit counter 990 produces two signals. The first is a shift signal on line 907 that provides the impetus for each contention and arbitration. The second is an end of contention signal on line 919 that provides the impetus to start the data framing circuit 600 of FIG. 2 over send enable line 623. Contention digit counter 990 applies a shift signal on line 907 until the counter reaches a count of three. Counter 934 applies an end signal on line 919 after it counts to three.

Binary counter 934 is in a 0 state before contention begins. Both terminals Q1 and Q2 of counter 934 are then low and, since NAND gate 935 is thus disabled, line 941 is high to prime NAND gate 933. When the phase clock pulses on line 923 start, they are inverted by NAND gate 933 and they increment binary counter 934. When counter 934 counts to a binary 3 at the end of the third occurrence of the assigned phase, NAND gate 935 is enabled by a high on Q1 and Q2 and its low output both turns off the shift pulses on line 907 by way of NAND gate 933. The low output also primes inverting AND gate 936 to pass clock pulses from line 108 to end line 919. The signal on both lines 917 and 907 influence contention logic 970.

Contention logic 970 is preset when the logic level on start line 908 first goes high. The rising edge of the signal on start line 908 loads shift register 903 with the port priority number stored in element 906. Element may be as simple as several jumpers connected variously to high and low supplies, or it may be as complex as a ROM. At the same time, the rising edge of the signal on start line 908 removes the clear on latch 910.

Next, the inverted phase clock signal on shift line 907 shifts the first priority number from shift register 903 to line 902. At this time, AND gate 901 is primed by the shift pulse on line 907 as inverted by inverter 921. The inverted shift pulse on line 942 enables AND gate 901 only during the contended phase and during contention. AND gate 901 is also primed by a high signal on contend line 916 which is set high by the set pulse on line 917. The set pulse is applied by line 917 and sets flip-flop 915. This raises the level on contend line 916 to a high. The signal on contend line 916 amounts to a switching signal that disables gate 901 if arbitration logic 900 of its port loses contention.

The logic level of each digit of the port priority number on line 902 is passed by enabled AND gate 901. AND gate 901 is an open collector device and a high port priority number or "1" is low true on arbitration line 110a and 902. Thus, the output of AND gate 901 is opened by a "0" bit and drawn low by a "1" bit. If a high logic level, a 0, is applied by shift register 903 to line 902 while a low logic level, a 1, is applied to arbitration line 110a by another port 101, the other port 101 has a higher priority number and the logic level on line 902 differs from the logic level on arbitration line 110a. Exclusive OR gate 909 compares its inputs from line 902 and from arbitration line 110a and applies a low level to line 943 if they match. It applies a high to line 943 if they do not.

A high on line 943 indicates that the arbitration logic 900 has lost contention on behalf of its port to a contending port with a higher priority number. The high is latched by data latch 910 to its Q output 914 in response to the rising edge of the shift pulse on line 907 at the end of the contended phase occurrence. The high on path 914 is extended through OR gate 912 to line 913 to reset flip-flop 915. Two signals result: a low logic level on contend line 916, and a high logic level on not-contend line 922. The low on contend line 916 stops contention immediately by disabling AND gates 901 and 937. The high logic level on not-contend line 922 resets transmission phase selector 980 and contention digit counter 990 by clocking a high through data latch 946. The resulting low at its not-Q terminal clears data latches 926 and 927 to set the logic level on start line 908 low. This low primes inverting AND gate 925. It also turns off the phase clock signal on line 923 by way of latch 930 and AND gate 931. This low on line 908 also clears binary counter 934 and latch 946. In summary, the clearing of latch 927 has resets elements 980 and 990 so that they are ready for another contention. In summary, when arbitration logic 900 loses contention, it is reset to its original state with request pending line 917 still active high. This starts the action by latch 927 to capture the next idle phase an arbitration frame line 110b.

A low on line 943 during contention indicates that the port priority digit currently applied to arbitration line 110a by AND gate 901 of port 101-n is at least equal to any digit currently applied to line 110a by any other contending port 101-n. Contention continues by a port under such conditions. When all priority numbers digits passed by AND gate 901 are equal or higher than the digits applied by the other contending ports, flip-flop 915 remains set. Contention is ended after the last digit is applied and the port with the highest priority number wins. The logic level on contend line 916 of the winning port remains high. This means the port has won contention assume port 101-n wins. Also, contention digit counter 990 finishes its count of three and, by way of NAND gate 935 enables inverting AND gate 936 as described. Pulses on clock line 108 pass through enabled AND gate 936 to the end line 919. A pulse on line 919 latches the high logic level on contend line 916 through data latch 918 and over path 623 to cause the data framing circuit 600 to begin data transmission during the phase just contended for.

When all of port's 101-n data is sent, transmitter 690 of FIG. 2 returns a signal indicating the end of the packet over lead 911 via gates 939 and 912 to reset flip-flop 915. The resulting high on lead 922 resets all circuits as previously described. Thus, the transmitter sends data on only one phase at a time.

NAND gate 937 turns on to provide a low at its assigned phase to arbitration frame line 110b while arbitration logic 900 is contending and afterwards while the port's data framing circuit 600 enables transmitter 690 to apply a destination port address to data bus 109a. The level of contend line 916 remains high during contention and address transmission to prime NAND one input of gate 937. The level of wait line 617 from the data framing circuit remains low, as subsequently described, until after transmitter 690 applies a destination port address to data bus 109a. This low is inverted by inverter 945 to prime another input of NAND gate 937 during that period. Under these conditions, the signal on phase clock line 923 causes NAND gate 937 to be turned on during each occurrence of the assigned phase of port 101-n. In summary, arbitration logic 900 of a contending port selects a idle phase, contends for the right to transmit during that phase, initiates the transmission process, and provides timing for the transmitter of its port during the assigned phase.

Circuit Description of Data Framing Circuit 600

The major elements of the data framing circuit are shown on FIG. 7. Data framing circuit 600 comprises port address enable 680 and data enable 670. They are shown on FIG. 7 along with arbitration logic 900 and transmitter output circuit 690. The data framing circuit 600 goes through the following states after a send enable 623 signal appears on FIG. 7: (1) Wait until data frame 109b is high (idle) to gate 601. (2) Send destination port address over data bus 109a. (3) Wait for arbitration frame line 110b to go high as a response from destination port. (4) Transmit data over data bus 109a. (5) Clear circuit 60 on end of packet signal 911.

The next two paragraphs provide a general description of the data framing circuit function. Data-framing circuit 600 causes transmitter 690 (FIG. 7) to apply destination port address and data to data bus 109a during the phase assigned to the port for transmission after arbitration logic 900 applies a phase clock signal to line 623 (FIG. 7). Framing circuit 600 holds data-frame line 109b low during the assigned phase occurrences from the time framing circuit 600 applies the receiving port address until the last byte of data is applied to data bus 109a. This low advises all ports that the data bus is currently busy on the assigned phase.

Port-address-enable circuit 680 (FIG. 7) applies a high to line 616 that has three effects in response to an enable signal on line 623 from the arbitration circuit and an idle data frame line 109b at that phase. The high on line 616 extends to line 621 where it enables buffer 612b to apply a destination address to data bus 109a. The high on line 616 also extends to line 619 where it draws data-frame line 109b low. The low on line 109b also resets latch 604a line 616 low at the next phase clock. Finally, the high on line 616 is clocked into latch 604b. The output of this latch and gate 608 is clocked into latch 604c. The output of latch 604c is combined with the phase clock signal on line 923 to produce pulses that shift data from shift register 612a onto data bus 109a. When all of the data of a packet in register 612a have been applied to data bus 109a, an end of packet signal on line 911 resets data latches 604b and 604c so the cycle may start again.

A detailed description of the above sequence follows. Arbitration logic 900 starts the port data transmission process by sending a high over line 623 after it successfully contends for data bus 109a access and wins contention on behalf of its port as described in conjunction with FIG. 6. This high on send enable line 623 is combined with the high on data frame line 109b by AND gate 601 which applies a high to line 613. At the beginning of each phase occurrence successfully contended for by the port arbitration logic 900, the assigned phase 1 for the present example, the signal on phase clock line 923 from the arbitration logic goes high to latch into element 604a the high on line 613. Latch 604a then applies a high to its Q output on line 616.

The high on line 616 causes OR gate 607 to apply a high to line 625 which, in turn, primes AND gate 609. Gate 609 turns on and applies a high to path 621 in response to a high on path 923 during each occurrence of the assigned phase. Buffer 612b is enabled by each high on line 621 when gate 609 turns on. Buffer 612b applies the destination address on bus 626 to data bus 109a in response to the first high on line 621. This address is the first byte of the stored packet. Register 612a is shifted by the falling edge of the high on line 621. This falling edge disables buffer 612b so the second byte is not yet applied to bus 109a.

Return to the beginning of the assigned phase and consider the actions of gates 606 and 605 prior to transmission. In response to the high on line 616, OR gate 606 applies a high to line 619 to cause NAND gate 605 to apply a low to data frame line 109b. The lower input of gate 605 is high during the assigned phase. This low on line 109b signals the other system ports that data bus 109a is currently in use during the assigned phase. The low on data frame line 109b also disables AND gate 601 to produce a low logic level on line 613. This low is latched by data latch 604a at the next assigned phase occurrence to produce a low on line 616. This terminates the enabling function of port address enable 680. The purpose of circuit 680 is to generate and apply to lead 616 a high signal that starts the transmission process. This has now been done.

This paragraph describes how the high on lead 616 is latched to produce a high on line 619 that lasts for the duration of transmission by the port. A high is on line 616 as the transmission process begins as described. Line 627 is high at this time via inverter 624 since line 911 is low. The high on line 627 primes AND gate 602. When the signal on line 616 is high and the resulting signal on line 619 is high via OR gate 606, gate 602 is enabled and applies a high to line 614. The rising edge signal on line 923 latches the high on line 614 into latch 604b at the beginning of the next occurrence of the assigned phase. The resulting high on line 617 into OR gate 606 holds line 619 high. The high on line 617 is applied to arbitration logic 900 which responds by letting arbitration frame line 110b go from a low to a high. This signals to other ports 101 that they may contend for the phase that is currently in use on data bus 109a. Presumably, by the time they win contention, the data transfer in the current port is completed. Thus, the system arbitration and data transfer functions overlap in time.

AND gate 608 is enabled by the high just produced on line 617. At this time, the receive enable circuit 700A of addressed receiving port 101-1 has received the transmitted address byte and either makes the level of arbitration frame line 110b low to indicate that the port 101-1 is already busy with incoming data during phase 0, or it makes the level of arbitration frame line 110b high to indicate that the port 101-1 is now free to receive data on data bus 109a during phase 1 occurrences. The signal on line 618 is low at this time, as subsequently described, so the signal on arbitration frame line 110b is applied by OR gate 629 to line 628. As long as the signal on line 628 is held low from a low on line 109b, line 618 remains low because disabled AND gates 608 and 603 keeps line 631 at a low. This low on line 631 is latched by latch 604c to maintain the low on line 618. Thus, the low on line 110b from the receiving port 101-1 holds line 618 low.

Line 618 must go to a high signal level for data transmission to be enabled as subsequently described. When the destination port 101-1 is no longer busy receiving data on another phase, its receive enable 700 permits the signal on arbitration frame line 110b to go high. AND gates 608 and 603 are enabled by this change of state because the signals on lines 617 and 627 are already high. So the next rising edge of the phase clock pulse on line 923 latches the high on line 631 into data latch 604c. The resulting high on line 618 enables AND gate 608 via OR gate 629 and enables AND gate 609 via OR gate 607. Gate 609 enabled applies a high to line 621. This high causes data output circuit 612a of transmitter 690 and buffer 612b to apply data to data bus 109a as follows.

Data are now shifted out of shift register 621a by a falling edge signal on line 621. The second byte of data in shift register 612a is currently applied to bus 626 when line 923 is high. The high on line 621 enables tri-state buffer 612b which applies the contents of bus 626 to data bus 109a. The subsequent pulses on phase clock line 923 alternately disable and enable AND gate 609. In turn, shift register 612a and buffer 612b are alternately shifted and enabled. This sequence continues until the last byte in register 612a is shifted onto bus 626.

Accompanying the last byte in register 612a is a flag bit that indicates the end of the packet. This bit appears on line 911 when the last byte of the packet appears on bus 626. The high on line 911 is inverted by inverter 624 and applied as a low to line 627. The low on line 627 disables AND gate 602 which applies a resulting low to line 614. This low on line 614 is latched into data latch 604b at the rising edge of the next pulse on phase clock line 923. The resulting low on line 617 extends to FIG. 6 where it enables the arbitration framing circuitry elements 945 and 937 of arbitration logic 900 as already explained. The end of packet bit on line 911 also resets the other elements of arbitration logic 900 as already explained. The low on line 617, combined with the existing low on line 616, causes a low on line 619 via OR gate 606 which disables AND gate 605. Disabled gate 605 allows the signal on data frame line 109b to go high.

The low on line 627 when line 911 goes high also disables AND gate 603. The resulting low on line 631 is latched by latch 604c. The consequent low on line 618 causes OR gate 607 to apply a low to line 625. The low on line 625 disables AND gate 609 which, in turn, applies a low to line 621 to disable buffer 612b until the next transmission sequence.

Thus, in summary, data framing circuit 600 has addressed a destination port and applied data to data bus 109a during occurrences of its assigned phase while holding the level of data frame line 109b low. It lets line 109b go high when it completes its function.

Circuit Description of Receive Enable Circuit 700

Receive enable circuit 700 is shown on FIG. 8 to comprises the contention circuit 796, arbitration framing circuit 797, enabling circuit 798 and address testing circuit 799.

The next two paragraphs provide a general description of the function of the receive enable circuits 700 and 700A. Each of receive enable circuits 700 and 700A (FIG. 8) is assigned to a different phase. They have the same function. Circuit 700 and phase 0 is used as an example. Circuit 700 detects contention by a port during phase 0 and reads a distination addresse applied to the data bus after contention by the winning port. When an address on data bus 109a is that of its port, circuit 700 takes action. If its receiver 724 is currently busy receiving data on another phase, circuit 700 prevents data transmission by the transmitting port by holding arbitration-frame line 110b low until receiver 724 of the receiving port is idle. If its receiver 724 is currently idle, receive enable circuit 700 applies a signal to line 722 to clock into receiver 724 to receive data present on data bus 109a.

The receiving process for receive enable circuit 700 begins when it receives a signal indicating the beginning of contention, a low, on arbitration frame line 100b. End-of-contention circuit 796 (FIG. 8) counts the time required for contention and after the idle state on data frame line 109b sends a pulse over line 720 that causes address-testing circuit 799 test the address present on data bus 109a. If the addresss on data bus 109a is that of the port of circuit 700, circuity 799 sends a high on "this address" line 723 to circuits 797 and 798 on FIG. 8. A high signal on line 780 from phase 1 receive enable circuit 700A indicates that receiver 724 is currently busy on the other phase. A low signal indicates that receiver 724 is idle. In response to this signal, circuit 797 either makes the level on arbitration frame line 110b low to indicate a busy receiver or its leaves the level of line 110b high to indicate an idle receiver. When the receiver is idle, circuit 797 enables circuit 798 with a high on line 710. Circuit 798 responds by sending a high for each phase 0 occurrence over line 721. These high signals causes receiver 724 to receive data from data bus 109a.

Receive enable circuit 700A is also shown on FIG. 8. The only difference in the circuitry of receive enable 700A and receive enable 700 is in the position of jumper 751 connected to phase line 107. Jumper 751 is connected to inverter 744 if receive enable circuit 700 is to enable receiver 724 during phase 0 rather than during phase 1. In either event, phase line 755 is high during the phase to which the receive enable circuit is assigned. Because of inverter 738, not-phase line 752 is low during the phase to which the receive enable circuit is assigned. Lines 755 and 752 are the two timing pulse trains mentioned in connection with FIG. 5. These pulse trains keep the circuits of receive enable circuit 700 timed to the proper phase.

Line 755 is connected to data latch 743. Another connection to data latch 743 is from clock line 108 via inverter 745. The signal on clock line 108 is a pulse train of the second harmonic of the pulse train on line 107. Therefore, the signal on line 746 has a rising edge at the center of each logic level of the signal on phase line 755. The signal on phase line 755 is latched by data latch 743 at the leading edge of the signal on line 746. This causes a signal on line 747 that lags the signal on phase line 755 by 90 degrees and that therefore goes high at the center of phase 0 assigned to receive enable circuit 700. The signal on line 747 is used to latch the signal on arbitration frame line 110b into data latch 742. This signal is inverted by latch 742 and applied to line 748 as a delayed and inverted arbitration frame signal. The time relationship of the various signals on FIG. 8 is shown on FIG. 14.

Recall the arbitration logic 900 of each contending port 101 draws low the signal on arbitration frame line 110b during contention by the port for the right to send data over data bus 109a during the assigned phase. Recall too that the next action taken by the data framing circuit 600 of the transmitting port 101-2 after it wins contention and the data frame line 109b is idle is to apply the address of the receiving port 101-1 to data bus 109a. It is the purpose of the rest of the circuitry of the end of contention circuit 796 of FIG. 8 to produce a pulse during phase 0 when the address of receiving port 101-1 is applied to the data bus by port 101-2.

Arbitration frame line 110b remains at a high signal level during phase 0 when no ports are contending. As the first port priority digit is applied during phase 0 to arbitration bus 110a during contention by the arbitration logic 900 of each contending port 101, a low appears on arbitration frame line 110b as well as on the input to latch 742.

In the center of a phase 0 occurrence, the leading edge of the signal on line 747 latches the low on arbitration frame on line 110b into latch 742. This causes a high to appear at the inverting output of latch 742 to clear counter 741. All outputs of counter 741 go low when cleared. The Q output of the counter on line 753 is inverted by element 740 and applied as a high to line 749. This high extends to and primes AND gate 760. Rising edges at the beginning of each phase 0 period on line 755 are extended through gate 760 and are counted by counter 741 until the number (3) of priority digits assigned to the ports have been counted. As the third digit is counted by the counter, it brings its Q output line 753 high to disable gate 760 via inverter 740. This action stops counter 741 since disabled gate 760 can no longer apply pulses over line 750 to counter 741. AND gate 701 is primed by the high on line 753.

The next high on data frame line 109b is extended by primed AND gate 701 to line 754. As explained, the data framing circuit 600 of any transmitting port 101 holds data frame 109b low during the assigned phase until the port 101 is done transmitting on data bus 109a. The port 101-2 that has won contention can not now apply a destination address to data bus 109a in the event that another port is currently transmitting during phase 0 and therefore holding data frame line 109b low. So both the port 101-2 that has won contention and the end of contention circuit 700 of receiving port 101-1 must wait until the signal on data frame line 109b goes high at the end of transmission by another port during phase 0 before taking further action. Subsequently, the phase 0 transmission by another port stops and data frame line 109b goes high during a phase 0 occurrence to indicate an idle data bus 109a.

The high data frame signal 109b is passed through primed AND gate 701 since counter 741 has counted three digits. The high on line 754 is latched through latch 704a at the end of the phase 0 occurrence by the rising edge of the signal on not-phase line 752. The high latched through data latch 704a primes NAND gate 705. The level at phase line 755 is low by the time the high level has been latched through latch 704a. The output of NAND gate 705 therefore remains high until the next occurrence of phase 0. The next phase 0 occurrence is the one in which the transmitting port 101-2 sends a destination address byte over data bus 109a. At this time, phase line 775 goes high and causes the output of NAND gate 705 on line 720 to go low. At the end of this phase 0 occurrence, when the address on data bus 109a is still stable, the phase signal 755 goes low and causes, via gate 705, the signal on line 720 to go high. It is the rising edge on line 720 that latches the address on data bus 109a through address latch 709. The general purpose of of the end of contention circuit 796 is now accomplished. That is, to provide a rising edge on line 720 when a denstination address is stable on data bus 109a.

Figure 13:
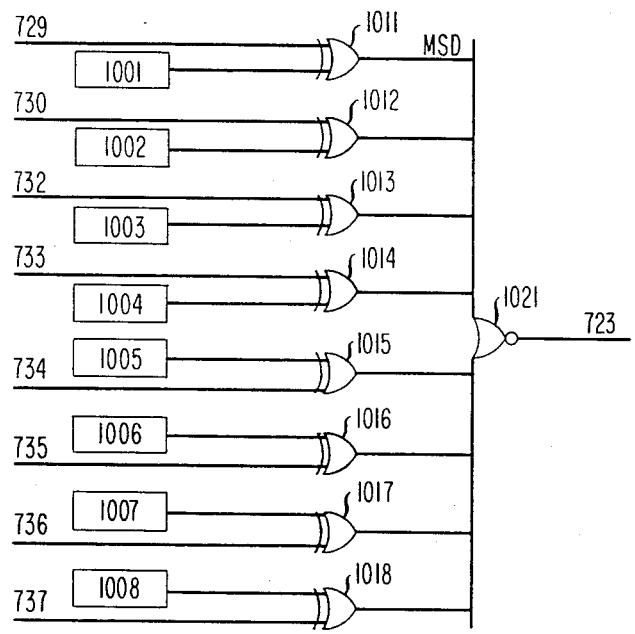
FIG. 13 illustrates details of the address comparator used in the receive enable circuits 700 and 700A.

The circuit used to recognize the current address when it is latched by address latch 709 is element 1000 of FIG. 8. This element is disclosed in detail in FIG. 13. Shown in FIG. 13 are a port number generator comprising digit generators 1001 through 1008 and a port address comparator comprising exclusive OR gates 1011 through 1018 and NOR gate 1021.

The address of receiving port 101-1 is stored in port address generators 1001-1008. Port address generators 1001-1008 may be as simple as eight jumper wires connected variously to high and low supplies or as complex as a read-only memory. Each digit of the address of the receiving port from port address generators 1001-1008 is compared by an exclusive OR gate, such as gate 1011, to the corresponding digit of the address of the port address received over data bus 109a and stored as just described in address latch 700. All gates 1011-1018 are alike. That is, a matching pair at the input of any exclusive OR gate causes a low at its output. For example, exclusive OR gate 1011 applies a low signal to NOR gate 1021 if the bit from line 729 matches the bit from digit generator 1001. If all such pairs match, the port addressed is port 101-1 and NOR gate 1021 applies a high signal to line 723 for use by the rest of the receive enable circuit 700 shown on FIG. 8. A high signal on line 723 indicates to the connected circuits that port 101-1 has been addressed and must receive data and transfer it to its associated connected station device 102-1.

After receiving port 101-1 has been addressed, the transmitting port 101-2 holds the signal on data frame 109b line low while it applies data to data bus 109a at its assigned phase. This signal on line 109b is inverted by inverter 756 to a high on line 726 to indicate that there are currently data on bus 109a. A high on line 726 is combined by AND gate 702 with a high on address match line 723 to indicate by a high on line 757 that there are now data on bus 109a for port 101-1. The rising edge of the signal on not-phase line 752 latches the high signal on line 757 through latch 704b at the end of the current phase 0 occurrence. This is the occurrence in which the destination address is latched and tested as just described. the logic level on line 758 thus goes high.

NAND gate 706 now indicates whether conditions are currently correct for port 101-1 to receive data. Some conditions have already been described. First, a high on line 758 indicates that transmitting port 101-2 is ready to transmit on phase 0 and that port 101-1 has been addressed on phase 0. Second, a high level on line 723 to the upper input of gate 706 indicates that port 101 is currently being addressed on phase 0. Third, a high on phae line 755 primes NAND gate 706 only during phase 0. Fourth, a high on line 780 indicates that receiver 724 of this port is currently busy receiving data from another port on phase 1. This signal on line 780 is generated is subsequently described.

Whenever receiver 724 is busy with data on phase 1 and, at the same time, is also being addressed on phase 0, NAND gate 706 is enabled and draws arbitration frame line 110b low via buffer 717 until receiver 724 becomes free. When receiver 724 becomes free, the signal on line 780 goes low and causes the output 710 of NAND gate 706 to go high. This high is applied to arbitration frame line 110b via buffer 717. This high on line 110b during phase 0 indicates to the data framing circuit 600 of the transmitting port 101-2 and enable circuit 798 of port 101-1 that port 101-1 is ready to receive data from data bus 109a during phase 0. Buffer 717 keeps external arbitration framing signals on line 110b from influencing enable circuit 798.

AND gate 703 applies a high signal on line 714 when conditions are correct for receiver 724 of FIG. 8 to receive data addressed to port 101-1 as follows. AND gate 703 applies a high level to line 714 when (1) a port is currently transmitting as indicated by a high on line 726, (2) when the transmission is to this port as indicated by a high on line 723, and (3) when receiver 724 is not busy with data on phase 1 as indicated by a high on line 710. The signal on line 714 can only be high during phase 0 because NAND gate 706 is disabled by the phase signal on line 755 during phase 1.

The momentary high signal on line 714 is latched through data latch 704c at the end of any phase 0 period by the signal on not-phase line 752. The resulting high level on line 718 remains as long as the conditions set out above favor reception. AND gate 707 is enabled only during phase 0 by the phase signal on line 755. The signal on line 721 is high during phase 0 as long as the signal on line 718 remains high. The signal on line 722 from OR gate 708 is the complement of the signal on line 721 and is low during phase 0 as long as the signal on line 718 remains high. The rising edge of the signal on line 722, therefore, appears at the end of phase 0, after the data on data bus 109a have stablized. It is this rising edge that latches data from data bus 109a through data latch 711. The data just latched by input data latch 711 is transferred to an associated station such as data processor 102-1.

Thus, in summary, receive enable circuit 700 detects the address of its port when an address is present on data bus 109a. It also enables receiver 724 to receive data for one of its associated stations.

The invention has been described with reference to a system having only two phases in order to minimize complexity and facilitate an understanding of the invention. An actual system could have more phases, such as 8 phases, in order to maximize use of the data bus 109a.

What is claimed is:

1. In a packet switching system having a plurality of ports interconnected by a data bus and by a data bus control conductor:

means for defining system data transfer cycles, means for subdividing each defined data transfer cycle into a plurality of phases, means for assigning different ones of said ports having data to transmit to different one of said phases, means in each one of said assigned ports for applying data to said data bus during an occurrence of the applying data to said data bus during an occurrence of the phase to which said one port is assigned whereby a plurality of said assigned ports can apply data to said bus during different phases of a single data transfer cycle, and means in said each one assigned port for applying a signal to said data bus control conductor during each assigned phase occurrence in which said one assigned port applies data to said data bus to indicate to other ones of said assigned ports a busy state of said data bus during each said occurrence of said assigned phase.

2. In a packet switching system having a plurality of ports interconnected by a data bus and by an arbitration control conductor and by an arbitration bus:

means for defining system data transfer cycles, means for subdividing each defined data transfer cycle into a plurality of phases, means for assigning each port having data to transmit to a unique one of said phases, means effective in each said assigned port for applying a first signal to said arbitration control conductor when said arbitration bus is in an idle state, means in each of said assigned ports for initiating a contention operation using said arbitration bus to grant one of said assigned ports access to said data bus, means in each said assigned port for applying a second signal to said arbitration control conductor during occurrences of the phase to which said last named port is assigned during a contention operation to preclude the initiation of another arbitration operation using said arbitration bus by another one of said ports, and means in each of said assigned ports granted access to said data bus for applying data to said data bus during an occurrence of the phase to which said one port is assigned whereby a plurality of said assigned ports can apply data to said bus during different phases of a single data transfer cycle.

3. The system of claim 2 in combination with:

means in a port that is granted data bus access for applying a destination port address to said data bus, means in said destination port responsive to the application of its address to said data bus when said destination port is not busy on another one of said phases for applying a first signal to said arbitration control conductor to indicate permission for said port that is granted data bus access to apply data to said data bus, and means in said destination port responsive to the application of its address to said data bus when said destination port is busy on another one of said phases for applying a second signal to said arbitration control conductor to deny permission for said grated port to apply data to said data bus.

4. In a packet switching system having a plurality of ports interconnected by a data bus having a busy and an idle state:

clock means for defining system data transfer cycles wherein each defined data transfer cycle has a plurality of phases, means in each port having data to transmit for requesting access to said data bus, means for assigning different ones of said requesting ports to different ones of said phases with each assignment being independent of the current busy/idle state of said data bus, means in each requesting port assigned to a phase for contending for data bus access only during occurrences of the phase to which each said requesting port is assigned, contention means for granting one of said assigned requesting ports access to said data bus during occurrences of said phase to which said one port is assigned, and means in said one granted port for transmitting data over said data bus only during an occurrence of the phase to which said one port is assigned whereby a plurality of said assigned ports can each transmit data over said bus during different phases of a single data transfer cycle.

5. The system of claim 4 in combination with:

an arbitration bus and an arbitration control conductor interconnecting said ports, means for applying a first signal to said arbitration control conductor when said arbitration bus is in an idle state, and means in each port requesting access to said data bus for applying a second signal to said arbitration control conductor during occurrences of the assigned phase of said requesting port during said contention operation to preclude the initiation of another contention operation during said assigned phase by a subsequently requesting one of said ports.

6. The system of claim 5 in combination with:

means in a requesting port that wins contention and is granted data bus access for applying a destination port address to said data bus, means in said destination port responsive to the application of its address to said data bus when said destination port is not currently busy or another one of said phases for applying a first signal to said arbitration control conductor to indicate permission for said granted port to apply data to said data bus, and means in said destination port responsive to the application of its address to said data bus when said destination port is busy on another one of said phases for applying a second signal to said arbitration control conductor to deny transmission permission for said granted port to apply data to said data bus.

7. The system of claim 6 in combination with:
a data control conductor interconnecting said ports, and
means in a port that is granted data bus access for applying a signal to said data control conductor during each assigned phase occurrence during which said granted port applies data to said data bus, said signal indicating a busy state of said data bus to other ones of said assigned ports.

8. The system of claim 7 in combination with:
means in said destination port effective when it is busy to another phase when a requesting port is granted data bus access for subsequently applying said first signal to said arbitration control conductor when said destination port becomes idle to grant permission for said granted port to apply data to said data bus.

9. A method of operating a packet switching system having a plurality of ports interconnected by a data bus and by a data bus control conductor, said method comprising the steps of:
(1) defining system data transfer cycles,
(2) subdividing each of said defined data transfer cycles into a plurality of phases,
(3) assigning different ones of said ports having data to transmit to different ones of said phases,
(4) applying data from an assigned port to said data bus during occurrences of the phase assigned to each port whereby a plurality of ports can apply data to said data bus during different phases of a single data transfer cycle, and
(5) applying a signal from an applying port to said data bus control conductor during each assigned phase occurrence in which said applying port applies data to said data bus, said signal indicating a busy state of said data bus to others of said assigned ports during each said occurrence of said assigned phase.

10. A method of operating a packet switching system having a plurality of ports interconnected by a data bus and by an arbitration bus control conductor, said method comprising the steps of:
(1) defining system data transfer cycles,
(2) subdividing each of said defined data transfer cycles into a plurality of phases,
(3) assigning different ones of said ports having data to transmit to different ones of said phases,
(4) initiating a contention operation to grant data bus access to one of said assigned ports,
(5) applying a busy signal to said arbitration control conductor from contending ones of said assigned ports during occurrences of the phase assigned to said contending ports whenever a contention operation is in progress to preclude the initiation of another contention operation by another one of said ports subsequently assigned to the same phase, and
(6) applying data to said data bus from an assigned port granted access to said data bus during occurrences of the phase to which said granted port is assigned whereby a plurality of ports can apply data to said data bus during different phases of a single data transfer cycle.

11. The method of claim 10 in combination with the steps of:
(1) applying a destination port address to said data bus from an assigned port that is granted data bus access,
(2) applying an idle signal from said addressed destination port to said arbitration control conductor in response to the application of its address to said data bus when said destination port is idle to indicate permission for said applying port by apply data to said data bus, and
(3) applying a busy signal from said destination port to said arbitration control conductor in response to the application of its address to said data bus when said destination port is busy on another phase to deny permission for said applying port to apply data to said data bus.

12. A method of operating a packet switching system having a plurality of ports interconnected by a data bus having a busy and an idle state, said method comprising the steps of:
(1) defining system data transfer cycles,
(2) subdividing each defined data transfer cycle into a plurality of phases,
(3) assigning different ones of said ports having data to transmit to different ones of said phases with each assignment being independent of the current busy/idle state of said data bus,
(4) operating each port having data to transmit to contend for data bus access only during occurrences of the phase to which each port is assigned,
(5) granting one of said contending ports access to said data bus during an occurrence of the phase to which said granted port is assigned, and
(6) transmitting data over said data bus from said one granted port only during an occurrence of the phase to which end said one granted port is assigned whereby a plurality of ports can each transmit data during different phases of a single data transfer cycle.

13. The method of claim 12 wherein said system further includes an arbitration bus and a first control conductor interconnecting said ports, said method further comprising the steps of:
(1) applying a first signal to said first control conductor prior to a contention operation when said arbitration bus is idle, and
(2) applying said second signal from a contending port to said first control conductor during occurrences of the assigned phase during a contention operation to preclude the initiation of another contention operation by a subsequently assigned port.

14. The method of claim 13 in combination with the steps of:
(1) applying a destination port address over said data bus from a port that wins contention and is granted data bus access,
(2) applying said first signal from said addressed destination port to said first control conductor in response to the application of its address to said data bus when said destination port is not busy on another phase to indicate permission for said granted port to apply data to said data bus, and
(3) applying a second signal from said addressed destination port to said first control conductor in response to the application of its address to said data bus when said destination port is busy on another phase to deny transmission permission to said granted port.

15. The system of claim 14 in combination with the step of:
(1) applying a signal from a granted port to a data bus control conductor interconnecting said ports during each assigned phase occurrence in which said granted port applies data to said data bus to indicate a busy state of said data bus during said assigned phase occurrences.

16. In an asynchronous packet switching system:
a plurality of ports,
a data bus interconnecting said ports with said data bus having a busy and an idle state,
means for defining sysem data transfer cycles wherein the time duration of each cycle is not less than the time required exchange data over said data bus between a sending one of said ports and a receiving one of said ports,
means for subdividing each defined data transfer cycle into a plurality of phases wherein the time duration of each phase is substantially less than the time required to exchange data over said data bus between a sending one of said ports and a receiving one of said ports,
means for assigning different ones of said ports having data to transmit to different ones of said phases with each assignment being independent of the busy/idle state of said data bus, and
means in each one of said assigned ports for applying data to said data bus during an occurrence of the phase to which said one port is assigned whereby a plurality of said assigned ports can apply data to said bus during different phases of a single data transfer cycle.

17. In an asynchronous packet switching system:
a plurality of ports,
a data bus and a control conductor interconnecting said ports,
means for defining system data transfer cycles,
means for subdividing each defined data transfer cycle into a plurality of phases,
means for assigning different ones of said ports having data to transmit to different ones of said phases,
means for granting one of said assigned ports access to said data bus during occurrences of the phase to which said one granted port is assigned,
means in said one granted port for applying a destination port address to said data bus during an occurrence of the phase to which said granted port is assigned,
means in said addressed destination port responsive to the application of its address to said data bus when said destination port is not busy on another one of said phases for applying a signal to said control conductor to indicate permission for said port that is granted data bus access to apply data to said data bus,
means in said addressed destination port responsive to the application of its address to said data bus when said destination port is busy on another one of said phases for applying a signal to said control conductor to deny permission for said granted port to apply data to said data bus, and
means in said one granted port for applying data to said data bus only during an occurrence of the phase assigned to said one granted port whereby a plurality of ports can apply data to said bus during different phases of a single data transfer cycle.

18. In an asynchronous packet switching system:
a plurality of ports,
a data bus interconnecting said ports with said data bus having a busy and an idle state,
means for defining system data transfer cycles,
means for subdividing each defined data transfer cycle into a plurality of phases,
means for assigning different ones of said ports having data to transmit to different ones of said phases with each assignment being independent of the busy/idle state of said data bus,
means for granting data bus access to one of said ports having data to transmit to a destination one of said ports,
means in said destination port for signaling said granted port to control the time at which said granted port begins the transmission of data to said destination port over said data bus, and
means in said one granted port for applying data to said data bus during an occurrence of the phase assigned to said one granted port whereby a plurality of assigned ports can apply data to said bus during different phases of a single data transfer cycle.

19. In an asynchronous packet switching system:
a plurality of ports,
a data bus interconnecting said ports with said data bus having a busy and an idle state,
means for defining system data transfer cycles,
means for subdividing each data transfer cycle into a plurality of phases,
means for assigning different ones of said ports having data to transmit to different ones of said phases for the transmission of data over said data bus between said ports,
each of said assignments being independent of the current busy/idle state of said data bus,
means in each one of said assigned ports for applying data to said data bus during an occurrence of the phase to which said one port is assigned whereby a plurality of ports can apply data to said bus during different phases of a single data transfer cycle, and
means whereby the time at which each assigned port begins its application of data to said data bus is controlled by the busy-idle state of the port to which each assigned port is to transmit data.

20. In an asynchronous packet switching system:
a plurality of ports,
a data bus interconnecting said ports and with said bus having an idle and a busy state,
clock means for defining system data transfer cycles wherein each data transfer cycle is divided into a plurality of phases,
means in each port having data to transmit for requesting access to said data bus,
means for assigning different ones of said requesting ports to different ones of said phases with each assignment being independent of the current busy/idle state of said data bus,
contention means for granting one of said ports assigned to a phase access to said data bus during occurrences of said phase to which said one port is assigned, and
means in said one granted port for transmitting data over said data bus during an occurrence of the phase to which said one granted port is assigned whereby a plurality of assigned ports can transmit data over said bus during different phases of a single data transfer cycle.

21. A method of operating an asynchronous packet switching system having a plurality of ports interconnected by a data bus having a busy and an idle state, said method comprising the steps of:
(1) defining data transfer cycles,
(2) subdividing each data transfer cycle into a plurality of phases,
(3) assigning different ones of said ports having data to transmit to different ones of said phases with each said assignment being independent of the current busy/idle state of said data bus,
(4) granting one of said ports assigned to a phase access to said bus during occurrences of said phase to which said port is assigned, and
(5) transmitting data over said data bus from said one granted port during an occurrence of the phase to which said one granted port is assigned whereby a plurality of ports can transmit data during different phases of a single data transfer cycle.

22. In an asynchronous packet switching system having a plurality of ports interconnected by a data bus having a busy and an idle state:

clock means for defining system data transfer cycle wherein each data transfer cycle is divided into a plurality of phases, means in each port having data to transmit for requesting access to said data bus, means for assigning different ones of said requesting ports to different ones of said phases whereby a plurality of requesting ports can be assigned to the same phase and whereby each assignment is independent of the current busy/idle state of said data bus, contention means for granting only one of said plurality of requesting ports assigned to the same phase access to said data bus during occurrences of said phase to which said one port is assigned, said contention means including means for contending for data bus access only during occurrences of the phase to which each requesting por is assigned, and means in said one granted port for transmitting data over said data bus during an occurrence of the phase to which said one granted port is assigned whereby a plurality of ports can each transmit a byte of data over said bus during different phases of a single data transfer cycle.

* * * * *